United States Patent
Hu et al.

(10) Patent No.: US 12,449,628 B2
(45) Date of Patent: Oct. 21, 2025

(54) OPTICAL COMPONENT DRIVING MECHANISM

(71) Applicant: TDK TAIWAN CORP., Taoyuan (TW)

(72) Inventors: Chao-Chang Hu, Taoyuan (TW); Chen-Hsien Fan, Taoyuan (TW); Yueh-Lin Lee, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 939 days.

(21) Appl. No.: 17/587,384

(22) Filed: Jan. 28, 2022

(65) Prior Publication Data
US 2022/0244487 A1    Aug. 4, 2022

Related U.S. Application Data

(60) Provisional application No. 63/143,344, filed on Jan. 29, 2021.

(51) Int. Cl.
| | | |
|---|---|---|
| *G02B 7/00* | (2021.01) | |
| *G02B 7/02* | (2021.01) | |
| *G02B 7/09* | (2021.01) | |
| *G02B 27/64* | (2006.01) | |
| *H04N 23/54* | (2023.01) | |
| *H04N 23/55* | (2023.01) | |

(52) U.S. Cl.
CPC ............. *G02B 7/028* (2013.01); *G02B 7/021* (2013.01); *G02B 7/023* (2013.01); *G02B 7/09* (2013.01); *G02B 27/646* (2013.01); *H04N 23/54* (2023.01); *H04N 23/55* (2023.01)

(58) Field of Classification Search
CPC ........ G02B 7/028; G02B 7/021; G02B 7/023; G02B 7/09; G02B 27/646; G02B 27/64; G02B 27/642; G02B 27/644; G02B 27/648; H04N 23/54; H04N 23/55; H04N 23/52; H04N 23/682
USPC ........................................................ 359/554
See application file for complete search history.

(56) References Cited

U.S. PATENT DOCUMENTS

| | | | | |
|---|---|---|---|---|
| 2014/0327965 A1* | 11/2014 | Chen | ............... | H04N 23/687 359/557 |
| 2022/0091363 A1* | 3/2022 | Kang | ............... | G02B 13/009 |
| 2024/0022816 A1* | 1/2024 | Yuan | ............... | G02B 27/646 |

* cited by examiner

*Primary Examiner* — Henry Duong
(74) *Attorney, Agent, or Firm* — MUNCY, GEISSLER, OLDS & LOWE, P.C.

(57) ABSTRACT

An optical component driving mechanism is provided. The optical component driving mechanism includes a first holder, a frame, and a first driving assembly. The first holder is configured to connect the first optical component. The frame includes a first accommodating space for accommodating the first holder. The first holder is movable relative to the frame. The first driving assembly is configured to drive the first holder to move relative to the frame.

18 Claims, 22 Drawing Sheets

OPTICAL COMPONENT DRIVING MECHANISM

CROSS REFERENCE TO RELATED APPLICATIONS

This application claims the benefit of U.S. Provisional Application No. 63/143,344, filed 29 Jan. 2021, the entirety of which is incorporated by reference herein.

BACKGROUND OF THE INVENTION

Field of the Invention

The present disclosure relates to an optical component driving mechanism, and more particularly to an optical component driving mechanism having driving assemblies, and which thereby is able to perform such functions as optical focusing and optical shake compensation.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF THE INVENTION

An optical component driving mechanism is provided. The optical component driving mechanism includes a first holder, a frame, and a first driving assembly. The first holder is configured to connect the first optical component. The frame includes a first accommodating space for accommodating the first holder. The first holder is movable relative to the frame. The first driving assembly is configured to drive the first holder to move relative to the frame.

According to some embodiments of the present disclosure, the first holder has a first opening. The first opening corresponds to the first optical component, which has a first optical axis. The first optical component is configured to receive an electromagnetic wave and output a signal.

According to some embodiments of the present disclosure, the optical component driving mechanism further includes a first circuit assembly. The first circuit assembly is electrically connected to the first driving assembly. The first circuit assembly is electrically connected to the first optical component. The first optical component and the first circuit assembly at least partially overlap when viewed along the first optical axis. The first circuit assembly is fixedly connected to the first holder.

According to some embodiments of the present disclosure, the optical component driving mechanism further includes a base fixedly connected to the frame. The base is adjacent to the first accommodating space. The base has a metal material. The base includes a second opening that corresponds to the first optical component.

According to some embodiments of the present disclosure, the base further includes a stopper portion. The stopper portion is configured to limit the range of motion of the first holder. The stopper portion has a metal material. The stopper portion is located between the first holder and the first circuit assembly when viewed along a first axis perpendicular to the first optical axis. The stopper portion, the first holder, and the first circuit assembly at least partially overlap when viewed along the first optical axis.

According to some embodiments of the present disclosure, the first holder has an avoidance portion. The avoidance portion corresponds to the stopper portion. The avoidance portion has a groove structure. The first holder has a non-metallic material.

According to some embodiments of the present disclosure, the frame further includes a second accommodating space, an inner wall, and a frame protrusion. The second accommodating space is configured to accommodate a second optical component. The inner wall has an inner surface. The frame protrusion protrudes from the inner wall. The extending direction of the frame protrusion is not parallel to the first optical axis of the first optical component. The frame protrusion is adjacent to the second accommodating space. The frame protrusion has a first frame surface that faces the first accommodating space. The frame protrusion overlaps the second accommodating space when viewed along a first axis. The first accommodating space is connected to the second accommodating space. The main axis passes through the first accommodating space and the second accommodating space.

According to some embodiments of the present disclosure, the optical component driving mechanism further includes a second holder, a second driving assembly, and a third driving assembly. The second holder is configured to connect the second optical component, which has a second optical axis. The second holder is movable relative to the frame and the first holder. The second driving assembly is configured to drive the second holder to move relative to the frame in a second dimension. The third driving assembly is configured to drive the first holder to move relative to the frame in a third dimension.

According to some embodiments of the present disclosure, the first driving assembly is configured to drive the first holder to move relative to the frame in a first dimension. The first dimension is different from the second dimension. The second dimension is different from the third dimension. The first dimension is different from the third dimension.

According to some embodiments of the present disclosure, the first dimension is movement in the plane formed by the first axis and a second axis, and the second dimension is movement along the second optical axis, the third dimension is rotation with a rotation axis as the axle center, and the rotation axis is parallel to the first optical axis.

According to some embodiments of the present disclosure, the first driving assembly includes a first magnetic component and a first coil. The first coil corresponds to the first magnetic component. The first coil includes a first segment. The first segment and the first magnetic component are configured to generate a first driving force. The second driving assembly includes a second magnetic component and a second coil. The second coil corresponds to the second magnetic component. The second coil includes a second segment. The second segment and the second magnetic component are configured to generate a second driving force. The third driving assembly includes a third magnetic component and a third coil. The third coil corresponds to the third magnetic component. The third coil includes a third segment. The third segment and the third magnetic component are configured to generate a third driving force. The arrangement direction of the magnetic poles of the first magnetic component is perpendicular to the first segment. The arrangement direction of the magnetic poles of the second magnetic component is perpendicular to the second segment. The arrangement direction of the magnetic poles of the third magnetic component is perpendicular to the third segment.

According to some embodiments of the present disclosure, a first side of the frame having a polygonal structure extends along the second axis when viewed along the main axis. The third magnetic component is located at the first side. The extending direction of the third segment is perpendicular to the second axis when viewed along the main axis. The arrangement direction of the magnetic poles of the third magnetic component is parallel to the second axis when viewed along the main axis. The extension direction of the first segment is parallel to the extension direction of the second segment. The extension direction of the third segment is not parallel with and not perpendicular to the extension direction of the first segment. The frame protrusion of the frame is configured to position the first magnetic component and the second magnetic component. The first magnetic component and the second magnetic component have an integrated structure.

According to some embodiments of the present disclosure, the optical component driving mechanism further includes a first support assembly and a second support assembly. The first support assembly includes a support component. The first holder is movable relative to the frame via the first support assembly. The support component is located at a corner of the frame when viewed along the main axis. The first magnetic component is located at the corner when viewed along the main axis. The second support assembly includes a first elastic component and a second elastic component. The second holder is movable relative to the frame via the second support assembly. The first support assembly partially overlaps the second support assembly when viewed along the first optical axis. The second holder is movably connected to the frame via the first elastic component and the second elastic component. The first elastic component is located in a third accommodating space of the frame. The frame protrusion has a second frame surface that faces the third accommodating space. The first frame surface and the second frame surface face in opposite directions. The third accommodating space is connected to the second accommodating space. The main axis passes through the third accommodating space. The first frame surface partially overlaps the second frame surface when viewed along the main axis.

According to some embodiments of the present disclosure, the optical component driving mechanism further includes a housing. The housing is fixedly connected to the frame. The housing is adjacent to the third accommodating space. The housing has a plate-like structure. The first elastic component and the second elastic component both have a plate-like structure. The first elastic component and the support component partially overlap when viewed along the main axis. The second elastic component and the support component do not overlap when viewed along the main axis.

According to some embodiments of the present disclosure, the optical component driving mechanism further includes a first sensing component and a second sensing component. The first sensing component is configured to sense the movement of the first holder. The second sensing component is configured to sense the movement of the second holder. When viewed in any direction perpendicular to the main axis, neither the first sensing component nor the second sensing component overlaps.

According to some embodiments of the present disclosure, the optical component driving mechanism further includes a second circuit assembly and a strengthening assembly. The second circuit assembly is electrically connected to the second driving assembly and the second sensing component. The second circuit assembly includes a first portion and a second portion, the first portion and the second portion both have a plate-like structure. The first portion and the second portion are not parallel to each other. The second sensing component is disposed on the first portion. The second driving assembly is electrically connected to the second circuit assembly via the strengthening assembly. The second driving assembly is electrically connected to the second circuit assembly via the second support assembly. The strengthening assembly is fixedly connected to the frame, wherein the strengthening assembly has a metal material, and the frame has a non-metallic material.

According to some embodiments of the present disclosure, the optical component driving mechanism further includes a third circuit assembly and a fourth circuit assembly. The first coil and the third coil are each embedded in the third circuit assembly. The third circuit assembly is electrically connected to a first circuit assembly via the fourth circuit assembly. The third circuit assembly and the fourth circuit assembly both have a plate-like structure. The fourth circuit assembly is electrically connected to the first sensing component. The first sensing component is disposed on the fourth circuit assembly. The third circuit assembly is disposed on the fourth circuit assembly. The first portion is not parallel to the fourth circuit assembly.

According to some embodiments of the present disclosure, the optical component driving mechanism further includes a magnetically permeable component. The magnetically permeable component corresponds to the first magnetic component. The magnetically permeable component is located on the first side when viewed along the main axis. The magnetically permeable component at least partially overlaps the first driving assembly when viewed along the main axis. The magnetically permeable component at least partially overlaps the second driving assembly when viewed along the main axis. The magnetically permeable component at least partially overlaps the third driving assembly when viewed along the main axis. The corner is adjacent to the first side when viewed along the main axis. The magnetically permeable component has a metal material. The magnetically permeable component is at least partially embedded in the first holder, and it is at least partially not exposed on the first holder.

According to some embodiments of the present disclosure, the first holder, the first circuit assembly, the third circuit assembly, and the fourth circuit assembly serve as a first movable portion. The first driving assembly is configured to drive the first movable portion to move relative to the frame. The second holder serves as a second movable portion. The second driving assembly is configured to drive the second movable portion to move relative to the frame.

According to some embodiments of the present disclosure, the optical component driving mechanism further includes a first shock absorbing component, a second shock absorbing component, a third shock absorbing component, and a fourth shock absorbing component. The first shock absorbing component restrains the abnormal movement of the first movable portion. The first shock absorbing component has flexibility; the first shock absorbing component has a non-metallic material. The first shock absorbing component is in direct contact with the first movable portion, the frame, and the third circuit assembly. The first shock absorbing component is located in the first accommodating space. The second shock absorbing component restrains the abnormal movement of the first movable portion. The second shock absorbing component is in direct contact with the first movable portion. The second shock absorbing component is in direct contact with the frame, a base and the first holder. The third shock absorbing component restrains the abnormal movement of the first movable portion. The third shock absorbing component is in direct contact with the first movable portion. The third shock absorbing component is in direct contact with the avoidance portion of the base, the first holder, and the first circuit assembly. The fourth shock absorbing component restrains the abnormal movement of the first movable portion and the second movable portion. The fourth shock absorbing component is in direct contact with the first movable portion. The fourth shock absorbing component is in direct contact with the second movable portion. The fourth shock absorbing component is in direct contact with the third circuit assembly and the second holder.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
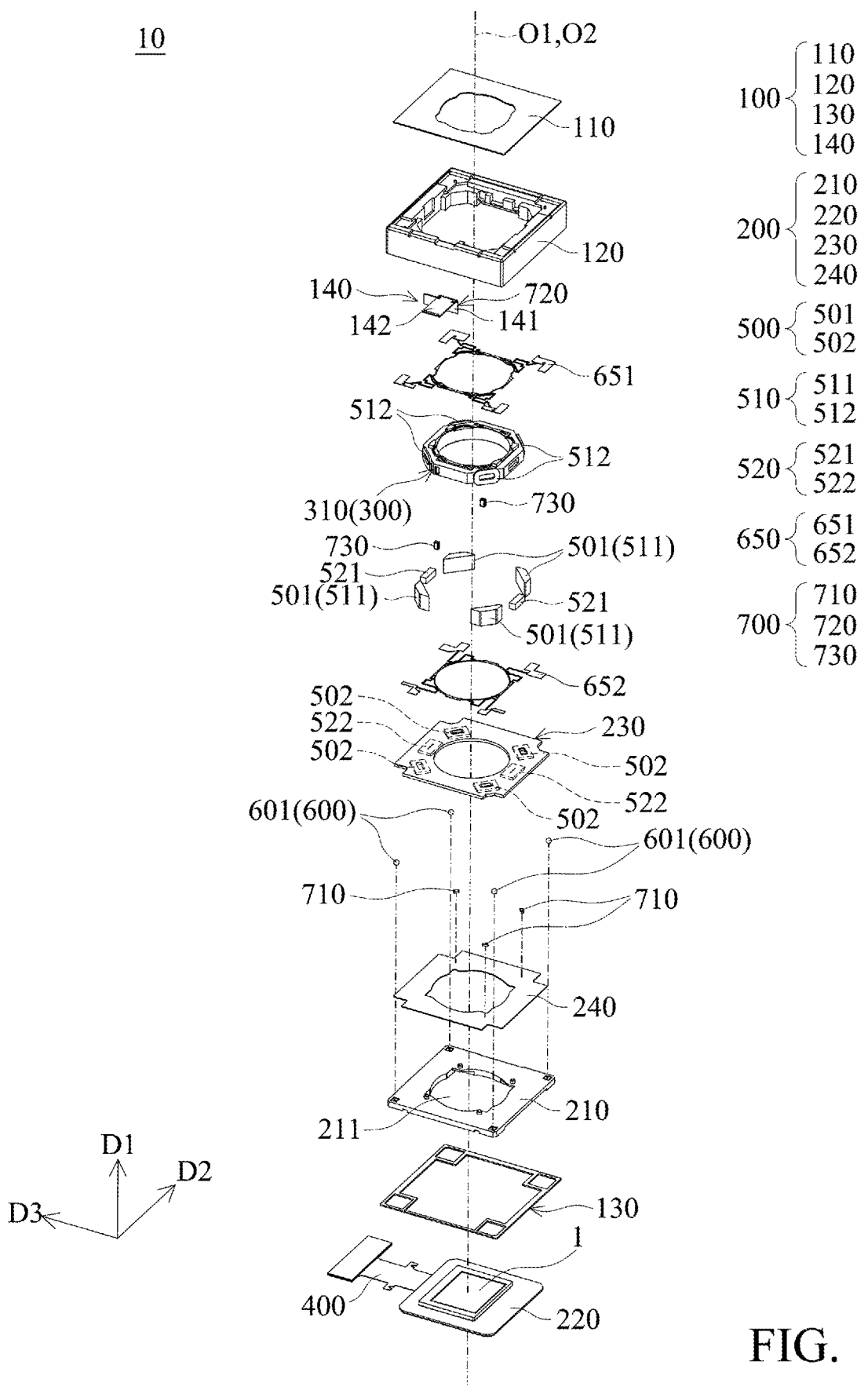
FIG. 1 shows an exploded view of an optical component driving mechanism, according to certain aspects of the present disclosure.

FIG. 1 shows an exploded view of an optical component driving mechanism 10, according to certain aspects of the present disclosure. The aforementioned optical component driving mechanism 10 may be disposed inside an electronic device such as a camera, a tablet computer, or a mobile phone, to obtain images. The aforementioned optical component driving mechanism 10 may relatively move both the first optical component 1 and the second optical component (not shown) disposed therein, so as to achieve the purpose of auto-focusing (AF) and optical image stabilization (OIS). The detailed structure of the optical component driving mechanism 10 is described below.

Figure 6:
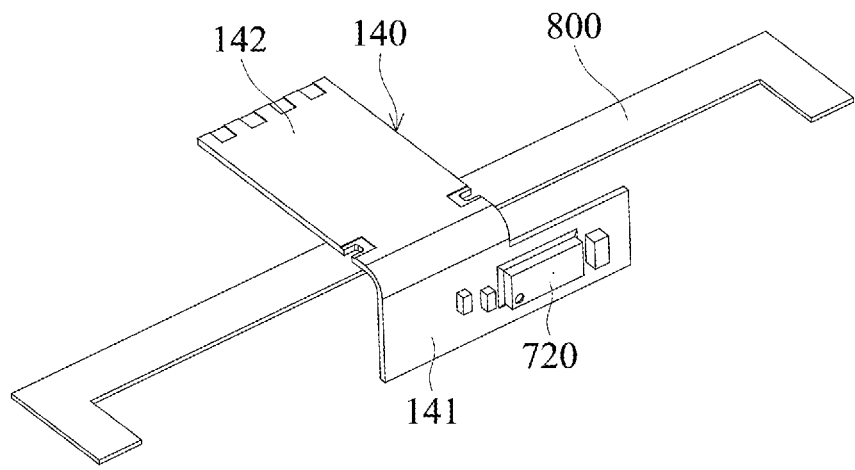
FIG. 6 shows a perspective view of the second circuit assembly, the second sensing component, and the strengthening assembly individually, according to certain aspects of the present disclosure.
Figure 6:
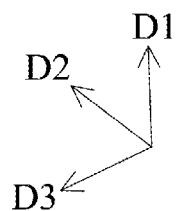
Figure 7:
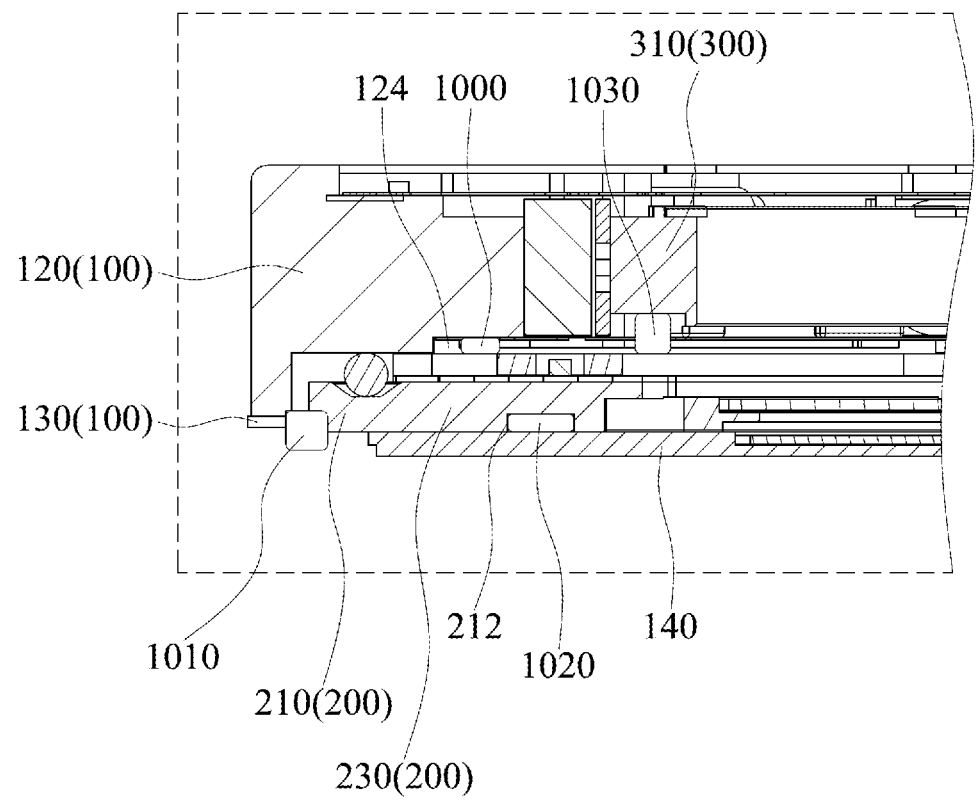
FIG. 7 is a schematic diagram showing the first shock absorbing component, the second shock absorbing component, the third shock absorbing component, and the fourth shock absorbing component, according to certain aspects of the present disclosure.
Figure 7:
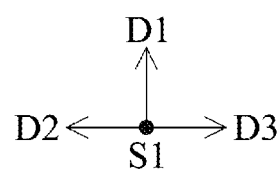

As shown in FIG. 1, the optical component driving mechanism 10 includes a fixed portion 100, a first movable portion 200, a second movable portion 300, a connecting portion 400, a first driving assembly 500, a second driving assembly 510, a third driving assembly 520, a first supporting assembly 600, a second supporting assembly 650, a sensing assembly 700, a strengthening assembly 800 (shown in FIG. 6), three magnetically permeable components 900 (shown in FIG. 11A to 11C), a first shock absorbing component 1000 (shown in FIG. 7), a second shock absorbing component 1010 (shown in FIG. 7), a third shock absorbing component 1020 (shown in FIG. 7), and a fourth shock absorbing component 1030 (shown in FIG. 7).

The fixed portion 100 includes a housing 110, a frame 120, and a base 130. The housing 110 has a plate-like structure, and the housing 110 is fixedly connected to the frame 120. The base 130 is fixedly connected to the frame 120. Details regarding the frame 120 are described in FIGS. 4A to 4C. In addition, the first movable portion 200 includes a first circuit assembly 220. The fixed portion 100 further includes a second circuit assembly 140.

The first circuit assembly 220 has a plate-like structure. The second circuit assembly 140 is disposed on the frame 120. The second circuit assembly 140 includes a first portion 141 and a second portion 142. Both the first portion 141 and the second portion 142 have a plate-like structure, and the first portion 141 and the second portion 142 are not parallel to each other.

The first movable portion 200 further includes a first holder 210, a third circuit assembly 230, and a fourth circuit assembly 240. The first holder 210 is fixedly connected to the first circuit assembly 220. The second movable portion 300 includes a second holder 310.

The first holder 210 is configured to connect a first optical component 1, and the second holder 310 is configured to connect a second optical component (not shown). In this embodiment, the first optical component 1 is configured to receive electromagnetic waves and output signals. The first optical component 1 and the second optical component may be optical components such as a photosensitive component, a camera lens, a lens, etc.

The first optical component 1 has a first optical axis O1, and the second optical component has a second optical axis O2. In this embodiment, the first optical axis O1, the second optical axis O2, and a main axis D1 are substantially parallel. The first optical component 1 and the first circuit assembly 220 at least partially overlap when viewed along the first optical axis O1. The first optical component 1 is electrically connected to the first circuit assembly 220.

Both the third circuit assembly 230 and the fourth circuit assembly 240 have a plate-like structure. The third circuit assembly 230 is disposed on the fourth circuit assembly 240. The third circuit assembly 230 is electrically connected to the first circuit assembly 220 via the fourth circuit assembly 240.

The optical component driving mechanism 10 may achieve the effect of optical image stabilization through the movement of the first movable portion 200 relative to the fixed portion 100. The optical component driving mechanism 10 may achieve the effect of auto-focusing through the movement of the second movable portion 300 relative to the fixed portion 100.

The optical component driving mechanism 10 carries the first optical component 1 and the second optical component (not shown). When the light from the outside enters the optical component driving mechanism 10, the incident light passes through from the light incident end (near the housing) to the light exit end. Between the light incident end to the light exit end, along the second optical axis of the second optical component, the light passes through the second optical component disposed in the optical component driving mechanism 10, and then to the first optical component 1 to obtain image. The connecting portion 400 is configured to connect the first circuit assembly 220 to an external circuit (not shown), wherein the first circuit assembly 220 or the connecting portion 400 may be connected to the external circuit through a flexible printed circuit board or TSA+ technique.

The first driving assembly 500 includes four first magnetic components 501 and four first coils 502. The second driving assembly 510 includes four second magnetic components 511 and four second coils 512. The third driving assembly 520 includes two third magnetic components 521 and two third coils 522.

The first magnetic component 501 and the second magnetic component 511 have an integrated structure, that is to say, the first magnetic component 501 and the second magnetic component 511 are not two separate components, and the first magnetic component 501 is also the second magnetic component element 511. In this way, the volume of the optical component driving mechanism 10 may be reduced to achieve miniaturization.

The first magnetic components 501, the second magnetic components 511, and the third magnetic components 521 are disposed on the frame 120. The first coils 502 and the third coils 522 are embedded in the third circuit assembly 230. The second coils 512 are disposed on the second holder 310.

The first driving assembly 500 is electrically connected to the first circuit assembly 220. The second driving assembly 510 is electrically connected to the second circuit assembly

140. The first driving assembly 500 is configured to drive the first holder 210 to move relative to the frame 120 in a first dimension. The first dimension is movement in the plane formed by a second axis D2 and a third axis D3. The second driving assembly 510 is configured to drive the second holder 310 to move relative to the frame 120 in a second dimension. The second dimension is movement along the second optical axis O2.

One of the features of the present disclosure is that the optical component driving mechanism 10 in the present disclosure includes a third driving assembly 520. The third driving assembly 520 is configured to drive the first holder 210 to move relative to the frame 120 in a third dimension. The third dimension is rotation with a rotation axis as the axle center, and the rotation axis is parallel to the first optical axis O1.

The first support assembly 600 may support the first holder 210 to move relative to the frame 120. The first support assembly 600 includes four support components 601. In this embodiment, the four support components 601 are all balls.

The second support assembly 650 may support the movement of the second holder 310 relative to the frame 120. The second support assembly 650 includes a first elastic component 651 and a second elastic component 652. The first support assembly 600 partially overlaps the second support assembly 650 when viewed along the first optical axis O1. The second holder 310 is movably connected to the frame 120 via the first elastic component 651 and the second elastic component 652.

The sensing assembly 700 includes three first sensing components 710, one second sensing component 720, and two sensing magnets 730. The second sensing component 720 cannot be seen in the viewing angle of FIG. 1, the configuration of the second sensing component 720 on the second circuit assembly 140 is described in detail with respect to FIG. 5 to FIG. 6.

The aforementioned first sensing components 710 and the second sensing component 720 may be Hall effect sensors, and the sensing magnet 730 may be a permanent magnet. The Hall effect sensor may determine the position of the permanent magnet by detecting the change of the magnetic field of the permanent magnet, thereby increasing the accuracy of compensation or focusing.

In another embodiment, other types of alignment components/assemblies, such as a magnetoresistive sensor (MRS) or an optical sensor, may also be used to detect the relative position of the first movable portion 200 and the second movable portion 300.

The first sensing components 710 are configured to sense the movement of the first holder 210. The first sensing components 710 are disposed on the fourth circuit assembly 240 and are electrically connected to the fourth circuit assembly 240. The second sensing component 720 is configured to sense the movement of the second holder 310. The second sensing component 720 is electrically connected to the second circuit assembly 140. The second sensing component 720 is disposed on the first portion 141 of the second circuit assembly 140.

The first sensing components 710 and the second sensing component 720 do not overlap when viewed in any direction perpendicular to the main axis D1. The sensing magnets 730 are disposed on the opposite sides of the second holder 310, the details of which will be shown in FIGS. 9A to 9B.

Figure 2A:
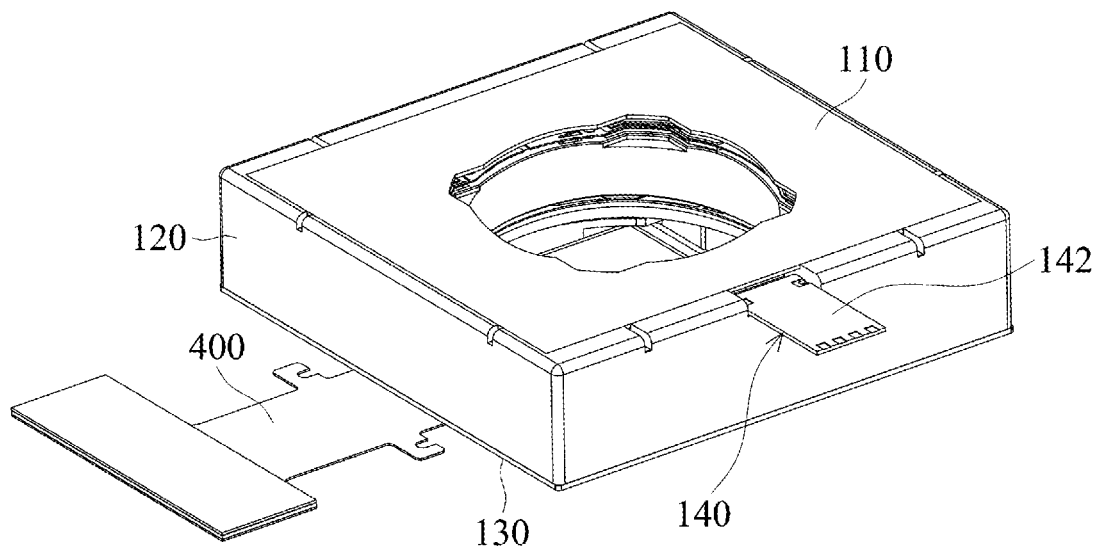
FIG. 2A is a perspective view of the optical component driving mechanism, according to certain aspects of the present disclosure.
Figure 2A:
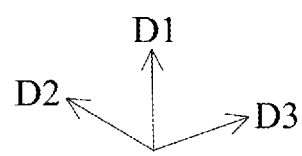

FIG. 2A is a perspective view of the optical component driving mechanism 10, according to certain aspects of the present disclosure. The housing 110, the frame 120, the second portion 142 of the second circuit assembly 140, the connecting portion 400, and a portion of the base 130 can be seen in FIG. 2A. The base 130 is fixedly connected to the frame 120.

Figure 2B:
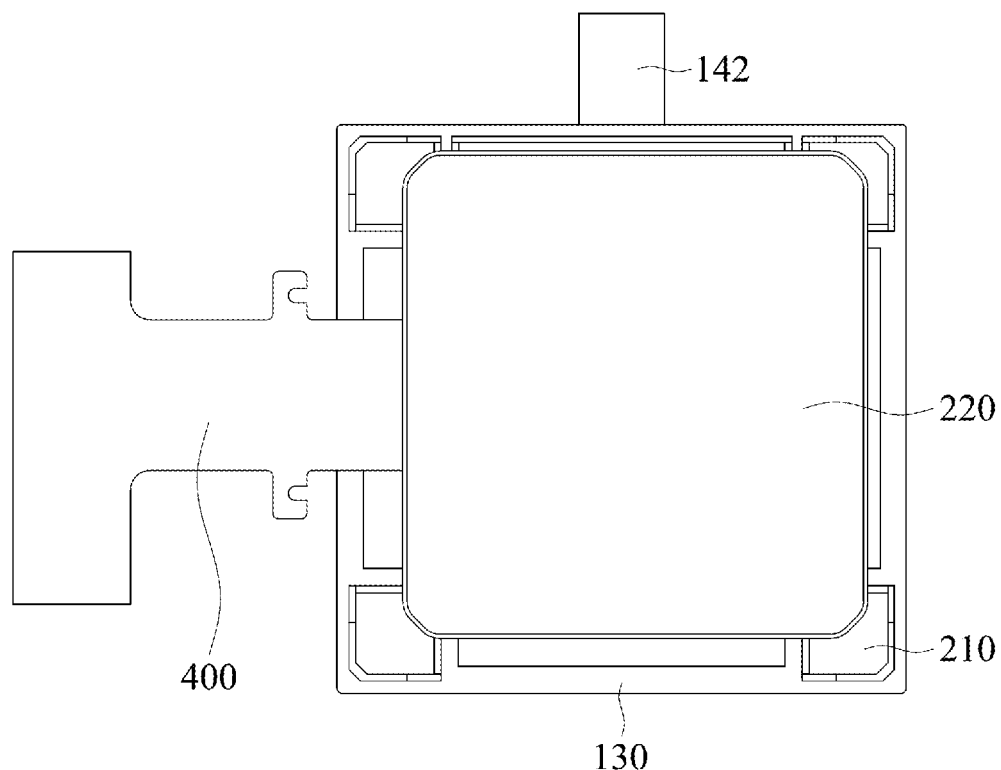
FIG. 2B is a bottom view of the optical component driving mechanism, according to certain aspects of the present disclosure.
Figure 2B:
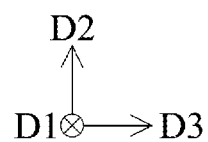

FIG. 2B is a bottom view of the optical component driving mechanism 10, according to certain aspects of the present disclosure. The first circuit assembly 200 is electrically connected to the connecting portion 400. The first circuit assembly 220 is fixedly connected to the first holder 210.

Figure 3A:
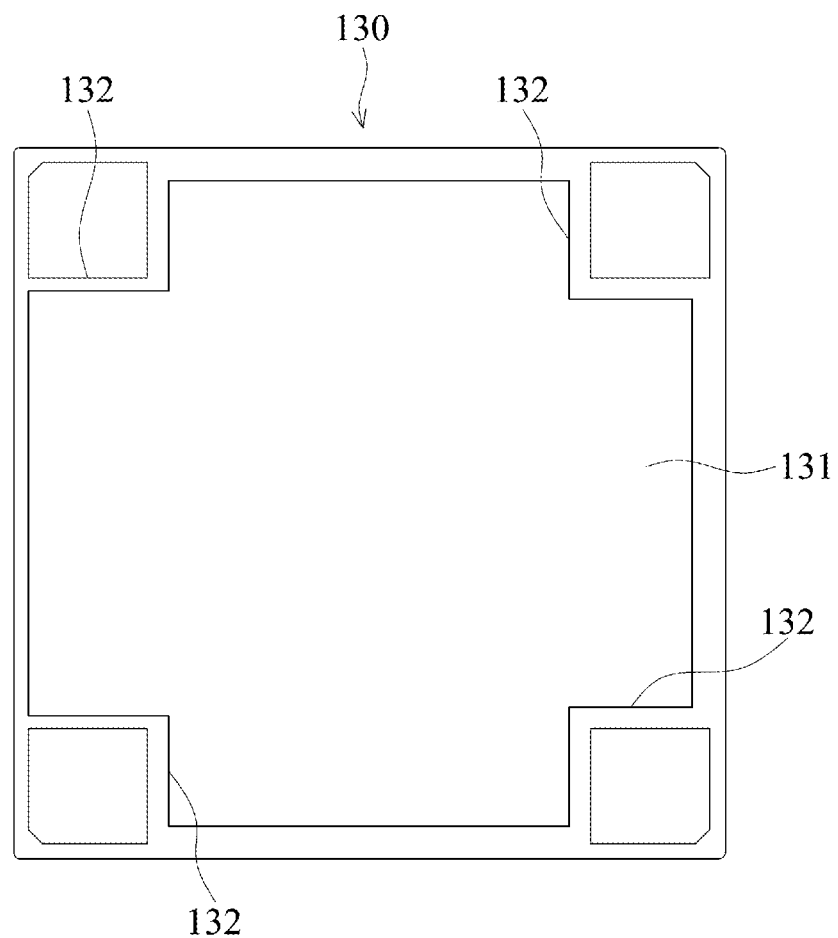
FIG. 3A is a bottom view of the base, according to certain aspects of the present disclosure.
Figure 3A:
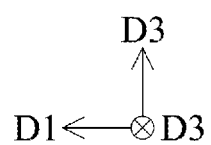
Figure 3B:
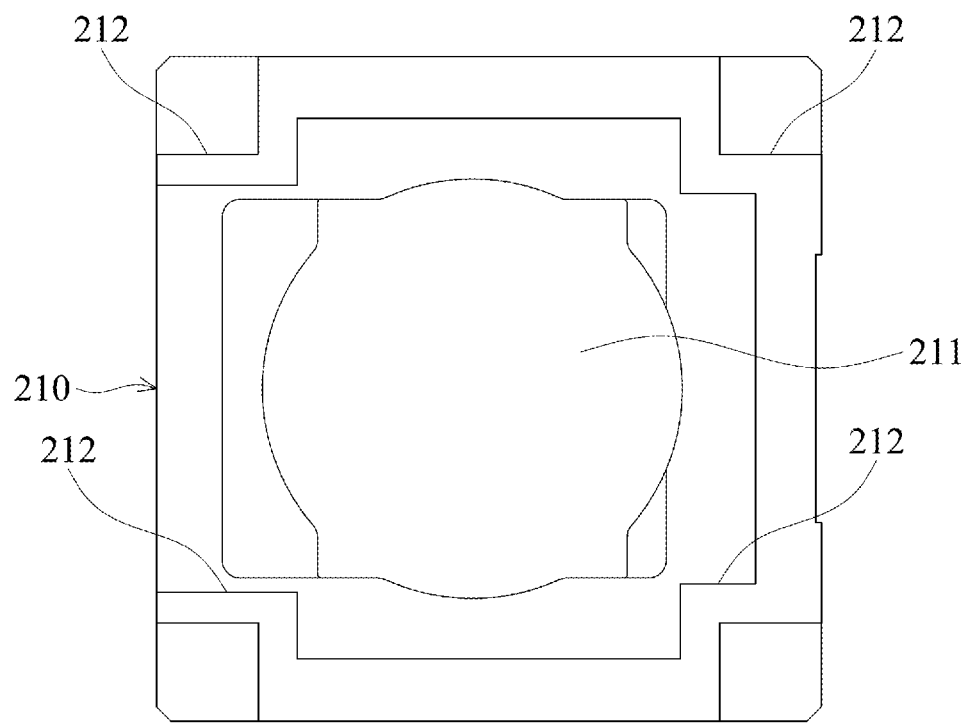
FIG. 3B is a bottom view of the first holder, according to certain aspects of the present disclosure.
Figure 3B:
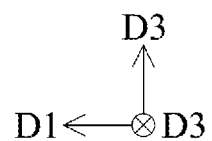

FIG. 3A is a bottom view of the base 130, according to certain aspects of the present disclosure. FIG. 3B is a bottom view of the first holder 210, according to certain aspects of the present disclosure. The base 130 includes a second opening 131 and four stopper portions 132. The base 130 is made of metal material. The first holder 210 includes a first opening 211, four avoidance portions 212, and four recess portions 213. The first holder 210 is made of non-metallic materials, such as plastic, fiberglass, or rubber, etc. Since the recess portion 213 cannot be seen in the viewing angle of FIG. 3B, the recess portion 213 is described in detail with respect to FIGS. 4A to 4B.

The first opening 211 and the second opening 131 correspond to the first optical axis O1 of the first optical component 1. The avoidance portion 212 is a groove structure for corresponding to the stopper portion 132. The stop portion 132 is configured to limit the range of motion of the first holder 210.

In detail, the stopper portion 132 is disposed in the avoidance portion 212, which has a groove structure. Therefore, when the first holder 210 is driven by the first driving assembly 500 or the third driving assembly 520 (FIG. 1) to move, the movement of the first holder 210 is limited by the stopper portion 132.

Figure 4A:
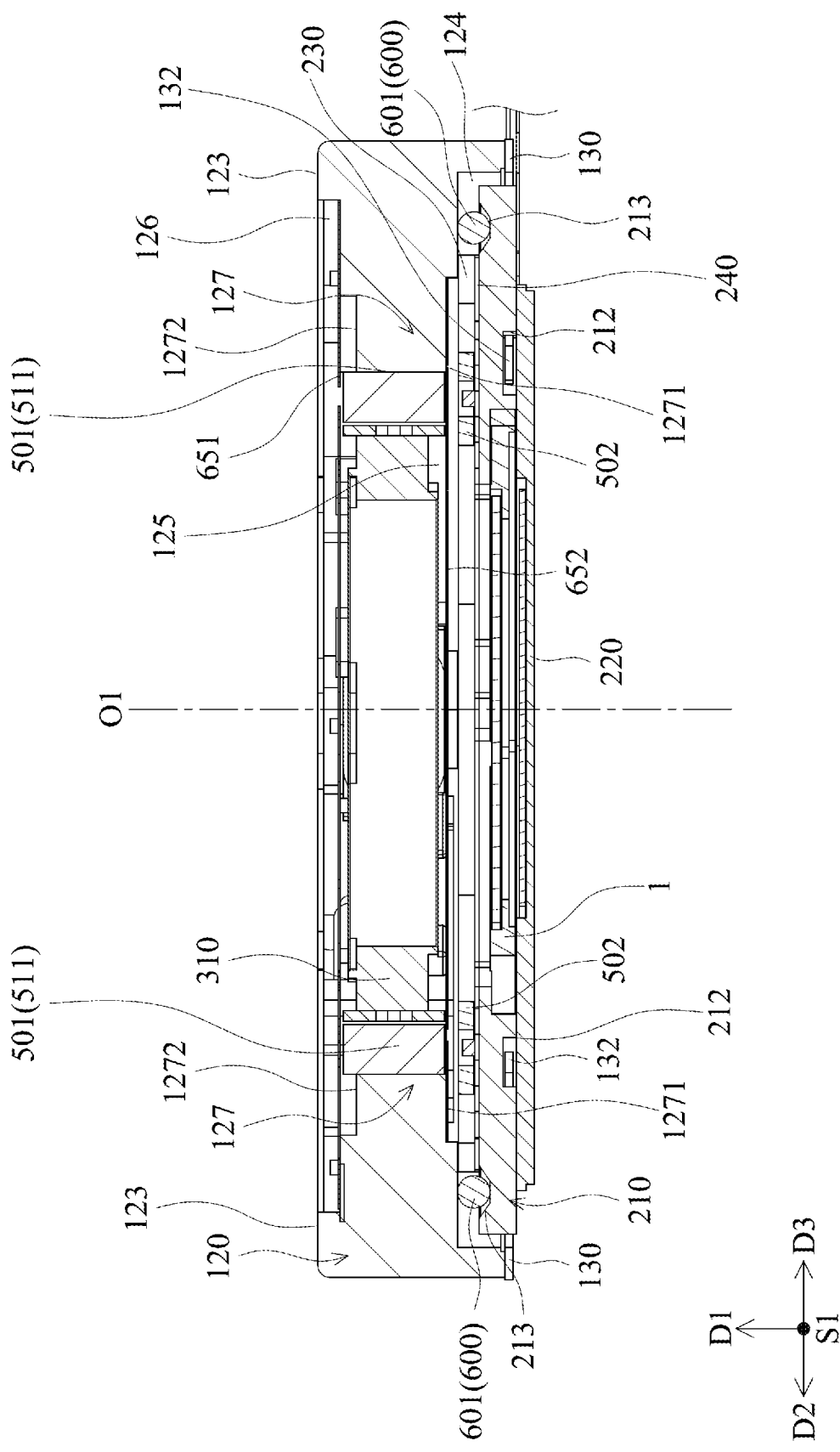
FIG. 4A is a cross-sectional view of the optical component driving mechanism, according to certain aspects of the present disclosure.
Figure 4B:
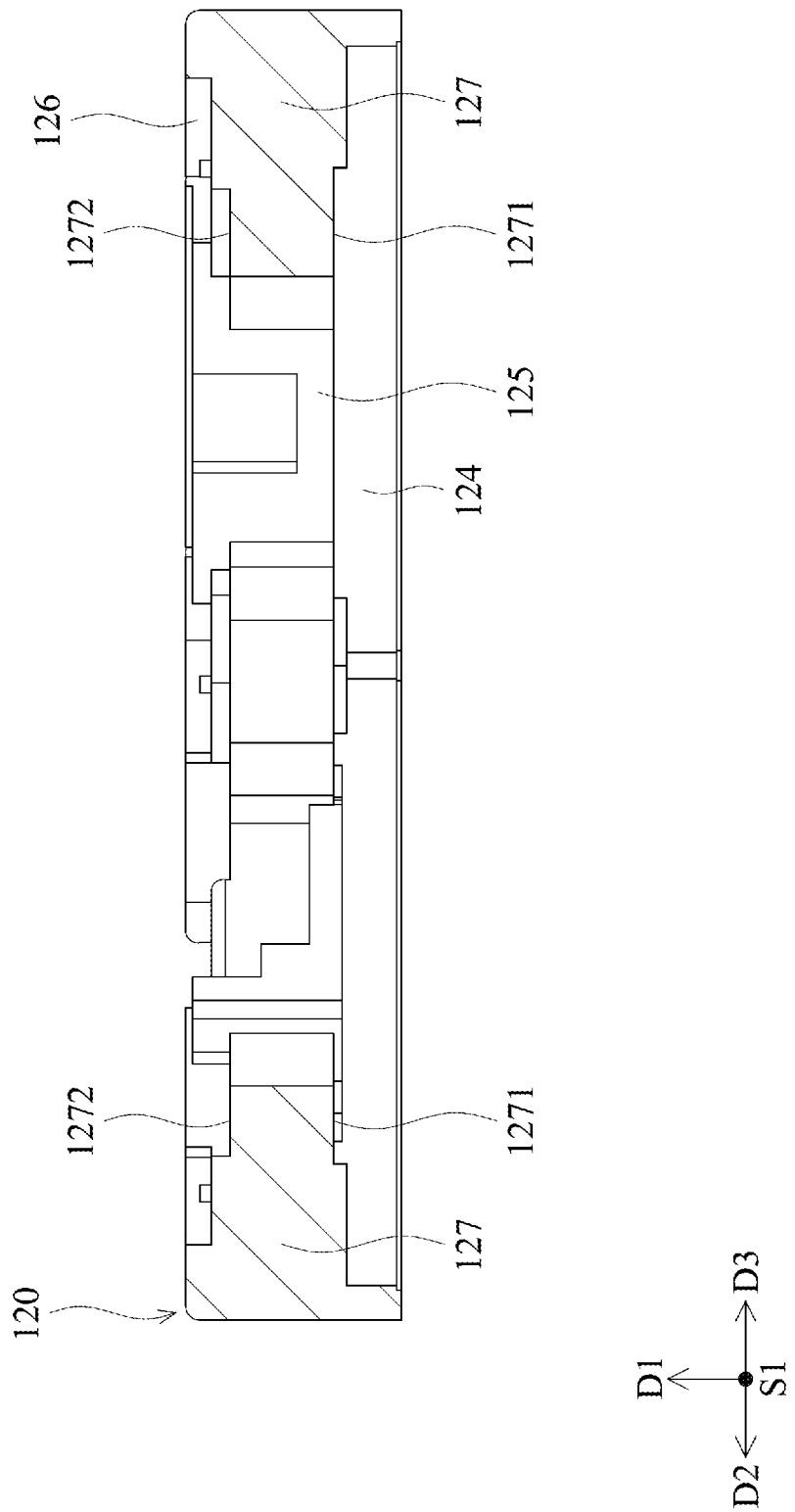
FIG. 4B is a cross-sectional view of the frame, according to certain aspects of the present disclosure.
Figure 4C:
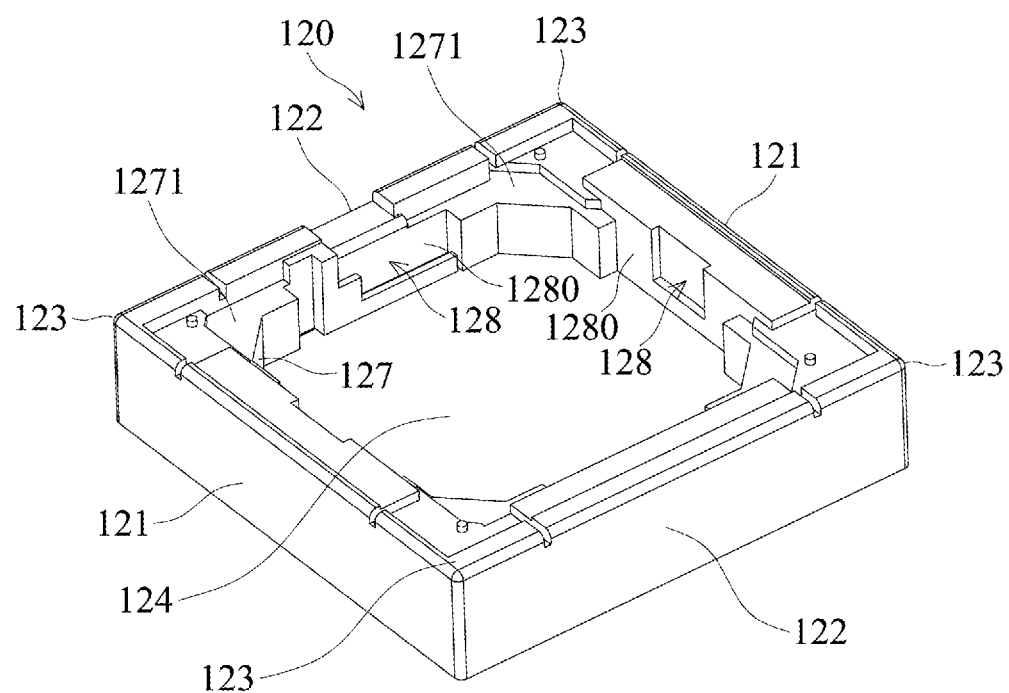
FIG. 4C is a perspective view of the frame, according to certain aspects of the present disclosure.
Figure 4C:
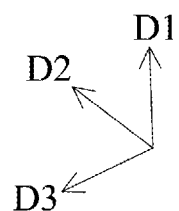

FIG. 4A is a cross-sectional view of an optical component driving mechanism 10, according to certain aspects of the present disclosure. FIG. 4B is a cross-sectional view of a frame 120, according to certain aspects of the present disclosure. FIG. 4C is a perspective view of a frame 120, according to certain aspects of the present disclosure. FIG. 4A and FIG. 4B is a cross-sectional view, which observed along a first axis S1 as viewing angles. The first axis S1 is an axis located on the plane formed by the second axis D2 and the third axis D3. Both the included angle between the first axis S1 and the second axis D2 and the included angle between the first axis S1 and the third axis D3 are 45 degrees. The relationships among the first axis S1, the second axis D2 and the third axis D3 are shown more clearly in FIG. 10B.

Referring to FIGS. 4A to 4C together, the frame 120 includes two first sides 121, two second sides 122, four corners 123, a first accommodating space 124, a second accommodating space 125, a third accommodating space 126, four frame protrusions 127, and four inner walls 128.

The first sides 121 are two opposite sides of the frame 120, and the second sides 122 are the other two opposite sides of the frame 120. The first sides 121 extend along the second axis D2. The first side 121 and the second side 122 are adjacent and perpendicular to each other. The four corners 123 are each located at the junction of the first side 121 and the second side 122. When viewed along the main axis D1, the support components 601 of the first support assembly 600 each located at four corners 123 of the frame 120.

The first accommodating space 124 is configured to accommodate the first holder 210. The first accommodating space 124 is adjacent to the base 130. The second accommodating space 125 is configured to accommodate the second holder 310 and the second optical component (not shown). The third accommodating space 126 is adjacent to the housing 110. The first elastic component 651 is located in the third accommodating space 126.

The main axis D1 passes through the first accommodating space 124, the second accommodating space 125, and the third accommodating space 126. The second accommodating space 125 is connected with the first accommodating space 124 and the third accommodating space 126, respectively. When viewed along the first optical axis O1, the stopper portion 132 and the first holder 210 and the first circuit assembly 220 at least partially overlap.

The frame protrusion 127 has a first frame surface 1271 and a second frame surface 1272. The first frame surface 1271 and the second frame surface 1272 face in opposite directions. The first frame surface 1271 faces the first accommodating space 124. The second frame surface 1272 faces the third accommodating space 126.

When viewed along the main axis D1, the first frame surface 1271 and the second frame surface 1272 partially overlap. The frame protrusion 127 is adjacent to the second accommodation space 125. The inner walls 128 have inner surfaces 1280, and the frame protrusions 127 protrude from the inner walls 128. The frame protrusions 127 overlap the second accommodation space 124 when viewed along the first axis S1.

The support components 601 are located at the corners 123 of the frame 120. The first magnetic components 501 are located at the corners 123 when viewed along the main axis D1. The corners 123 are adjacent to the first sides 121 when viewed along the main axis D1.

In the present embodiment, the support components 601 are positioned in the recess portions 213. The support components 601 contact the frame 120 and the first holder 210 respectively, so as to assist the first holder 210 to move relative to frame 120 when the first driving assembly 500 (FIG. 1) or the third driving assembly 520 (FIG. 1) drives the first holder 210.

As shown in FIG. 4A, the stopper portion 132 is positioned in the groove structure of the avoidance portion 212. When the first movable portion 200 are driven by the first driving assembly 500 (FIG. 1) or the third driving assembly 520 (FIG. 1), and move to a limit position, the avoidance portion 212 will contact the stopper portion 132 and limit the first movable portion 200 within a certain range of movement.

Figure 5:
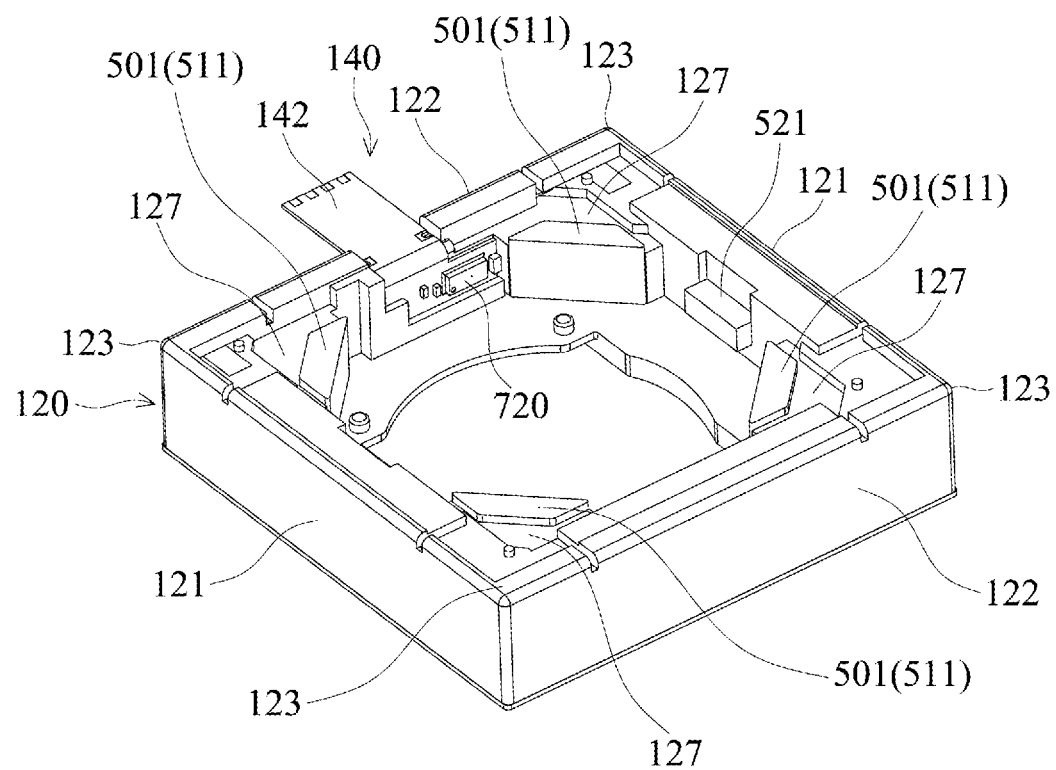
FIG. 5 is a perspective view of the frame, the first magnetic component, the second magnetic component, the third magnetic component, the second circuit assembly, and the second sensing component, according to certain aspects of the present disclosure.

FIG. 5 is a perspective view of the frame 120, the first magnetic component 501, the second magnetic component 511, the third magnetic component 521, the second circuit assembly 140, and the second sensing component 720, according to certain aspects of the present disclosure. FIG. 6 shows a perspective view of the second circuit assembly 140, the second sensing component 720, and the strengthening assembly 800 individually, according to certain aspects of the present disclosure.

As shown in FIG. 5, the frame protrusion 127 positions the first magnetic component 501 and the second magnetic component 511, which have an integrated structure. The first magnetic components 501 and the second magnetic components 511 having an integrated structure are each located at the corners 123 of the frame 120.

The two third magnetic components 521 are each located on the two first sides 121, although only one third magnetic component 521 can be seen in the viewing angle of FIG. 5. In this embodiment, the third magnetic component 521 is disposed on the frame 120, but in different embodiments, the third magnetic component 521 may be disposed on the second holder 310 or the frame 120.

The second sensing component 720 is disposed on the first portion 141. The second circuit assembly 140 is electrically connected to the second driving assembly 510 (FIG. 1) and the second sensing component 720. The second driving assembly 510 is electrically connected to the second circuit assembly 140 via the first elastic component 651 (FIG. 1).

Referring to FIG. 5 to FIG. 6 together, the strengthening assembly 800 is made of a metal material. The strengthening assembly 800 is fixedly connected to the frame 120. The second driving assembly 510 is electrically connected to the second circuit assembly 140 via the strengthening assembly 800. In this embodiment, the strengthening assembly 800 is embedded in the frame 120, and this configuration may achieve the effect of miniaturization.

For illustration purposes, FIG. 7 is a schematic diagram showing a first shock absorbing component 1000, a second shock absorbing component 1010, a third shock absorbing component 1020, and a fourth shock absorbing component 1030. The first shock absorbing component 1000, the second shock absorbing component 1010, and the third shock absorbing component 1020 are configured to restrain the abnormal movement of the first movable portion 200. The fourth shock absorbing component 1030 is configured to restrain the abnormal movement of the first movable portion 200 and the second movable portion 300.

The first shock absorbing component 1000, the second shock absorbing component 1010, the third shock absorbing component 1020, and the fourth shock absorbing component 1030 have flexibility, and are all made of non-metallic materials. In this embodiment, the first shock absorbing component 1000, the second shock absorbing component 1010, the third shock absorbing component 1020, and the fourth shock absorbing component 1030 may be gels.

As shown in FIG. 7, the first shock absorbing component 1000 is located in the first accommodating space 124. The first shock absorbing component 1000 is in direct contact with the third circuit assembly 230 of the first movable portion 200 and the frame 120 of the fixed portion 100. The second shock absorbing component 1010 is in direct contact with the first holder 210 of the first movable portion 200 and the frame 120 and the base 130 of the fixed portion 100.

As shown in FIG. 7, the third shock absorbing component 1020 is located in the groove structure of the avoidance portion 212, and the third shock absorbing component 1020 is in direct contact with the first holder 210 of the first movable portion 200, the first circuit assembly 140 and the base 130. The fourth shock absorbing component 1030 is in direct contact with the third circuit assembly 230 of the first movable portion 200 and the second holder 310 of the second movable portion 300.

Figure 8:
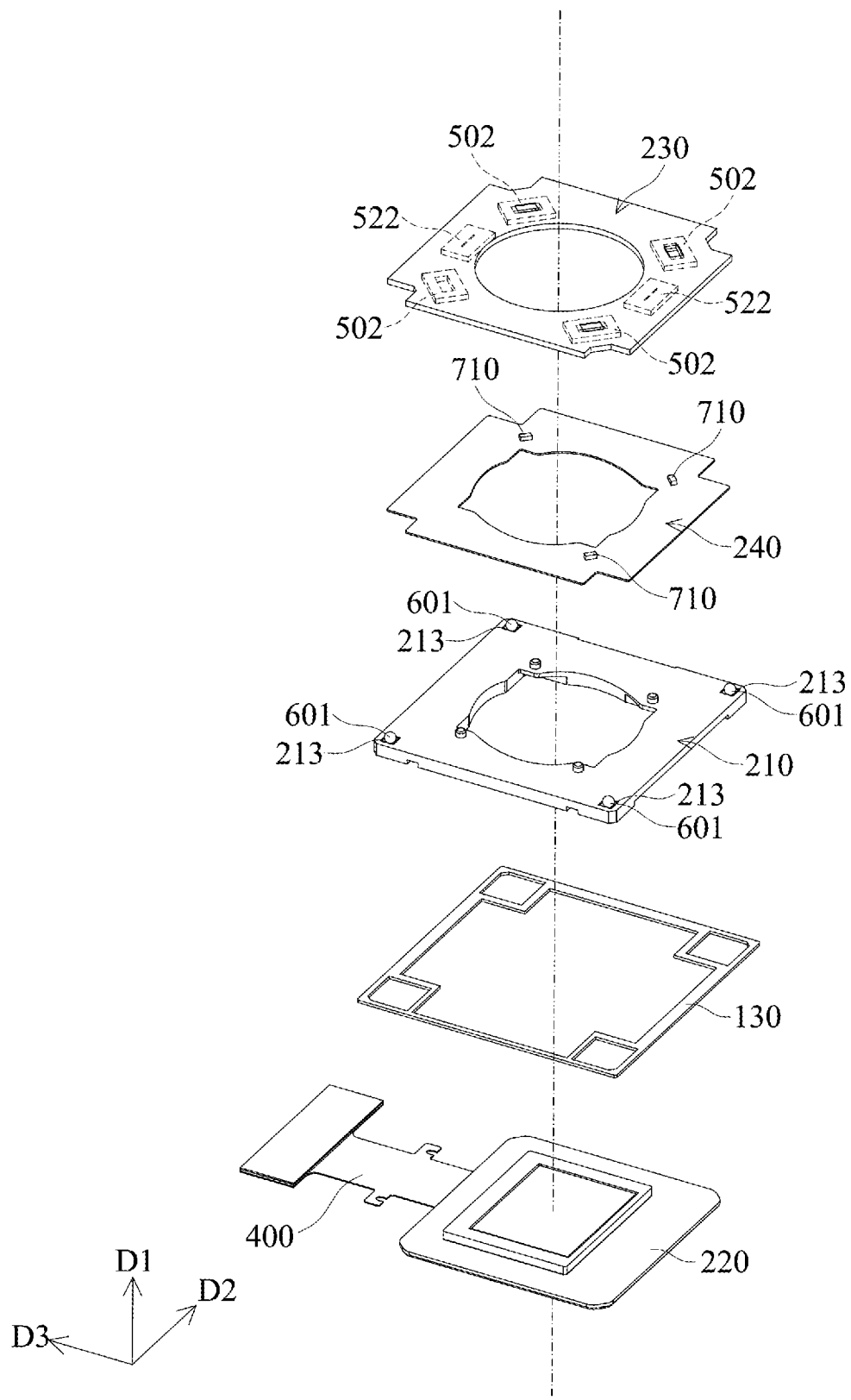
FIG. 8 is a perspective view shows the first coil and the third coil embedded in the third circuit assembly with dash lines, according to certain aspects of the present disclosure.

FIG. 8 shows the first coils 502 and the third coils 522 embedded in the third circuit assembly 230 with dash lines. The support components 601 are disposed in the recess portion 213 on the first holder 210. The first sensing component 710 is disposed on the fourth circuit assembly 240.

The first magnetic components 501 (FIG. 1) disposed on the frame 120 correspond to the first coils 502 disposed on the third circuit assembly 230 to drive the first holder 210 (FIG. 1) in the first dimension. The third magnetic components 521 (FIG. 1) disposed on the frame 120 correspond to the third coils 522 disposed on the third circuit assembly 230 to drive the first holder 210 (FIG. 1) to move in the third dimension.

Figure 9A:
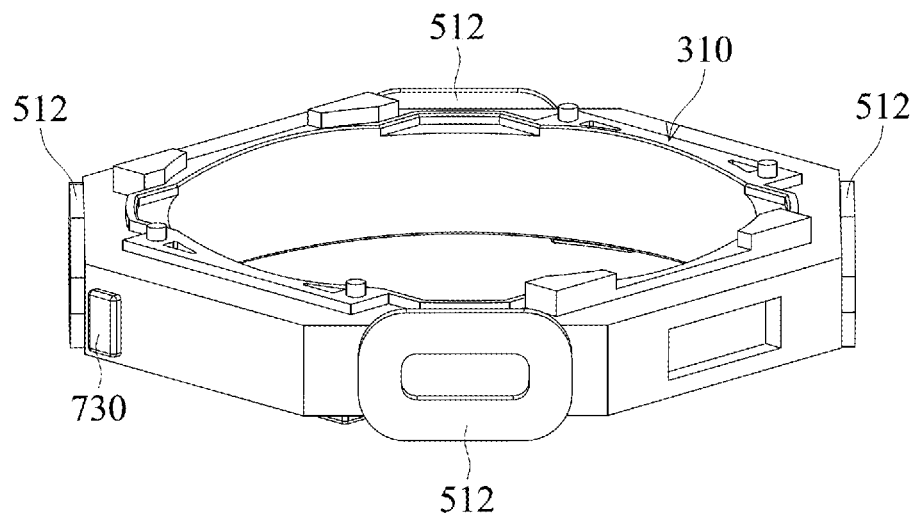
FIG. 9A is a perspective view of the second holder, the second coil, and the second sensing component, according to certain aspects of the present disclosure.
Figure 9A:
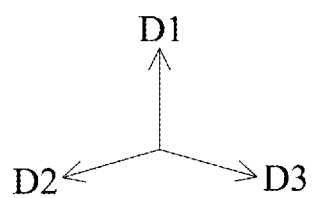
Figure 9B:
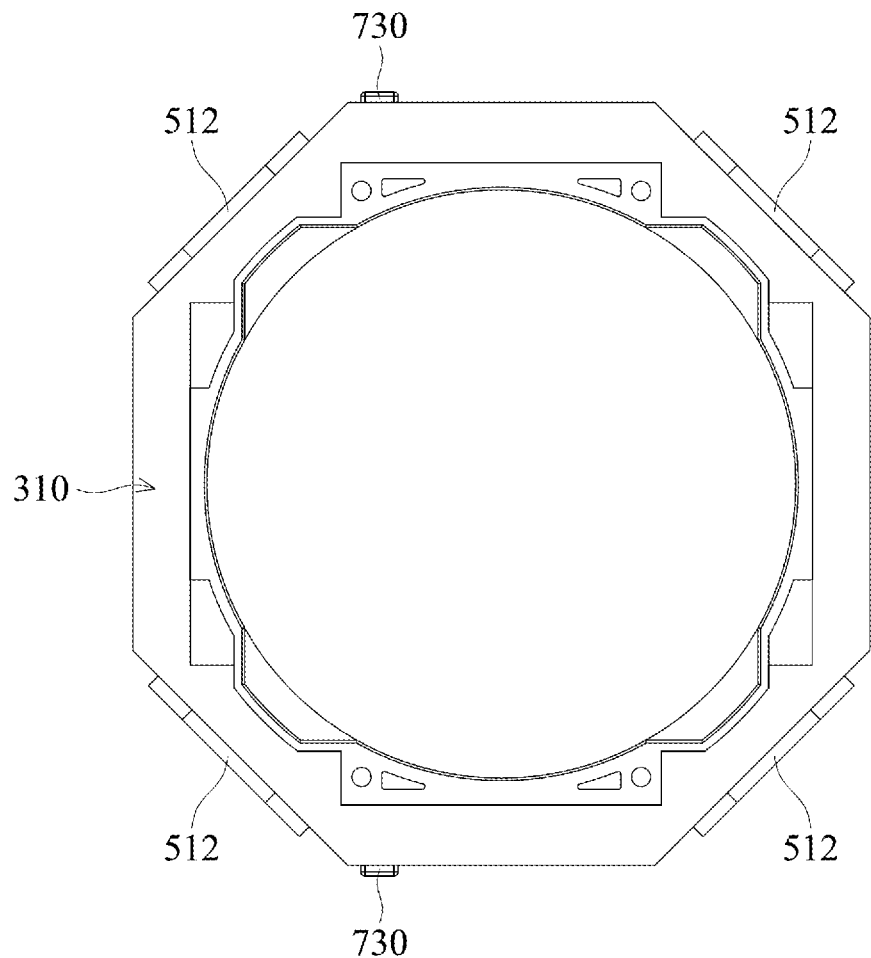
FIG. 9B is a top view of the second holder, the second coil, and the second sensing component, according to certain aspects of the present disclosure.
Figure 9B:
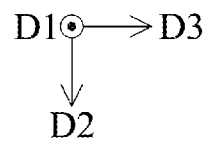

FIG. 9A is a perspective view of the second holder 310, the second coil 512, and the sensing magnet 730, according to certain aspects of the present disclosure. FIG. 9B is a top view of the second holder 310, the second coil 512, and the second sensing component 730, according to certain aspects of the present disclosure.

The second coils 512 correspond to the second magnetic components 511 (FIG. 5) provided on the frame 120 to drive the second holder 310 to move in the second dimension. As shown in FIGS. 9A to 9B, four second coils 512 are wound on the second holder 310, and two sensing magnets 730 are disposed on two opposite-facing surfaces of the second holder 310.

Figure 10A:
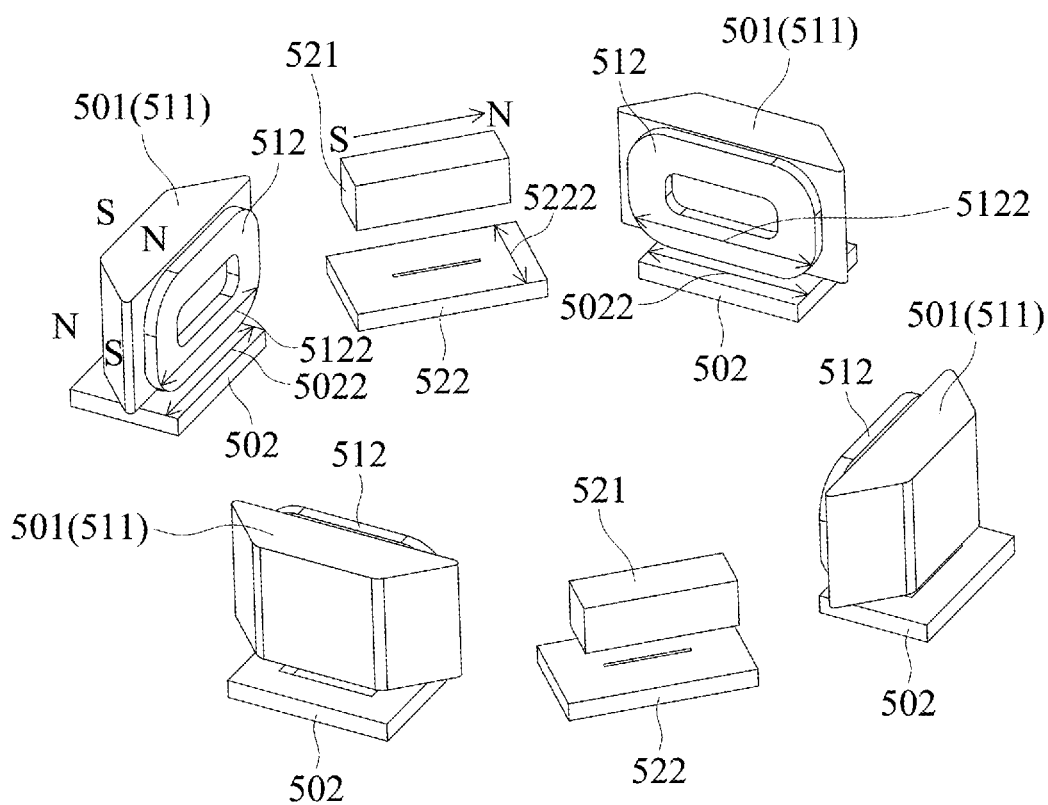
FIG. 10A shows a perspective view of the first driving assembly, the second driving assembly, and the third driving assembly individually, according to certain aspects of the present disclosure.
Figure 10A:
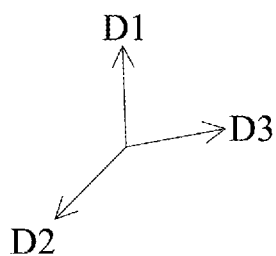
Figure 10B:
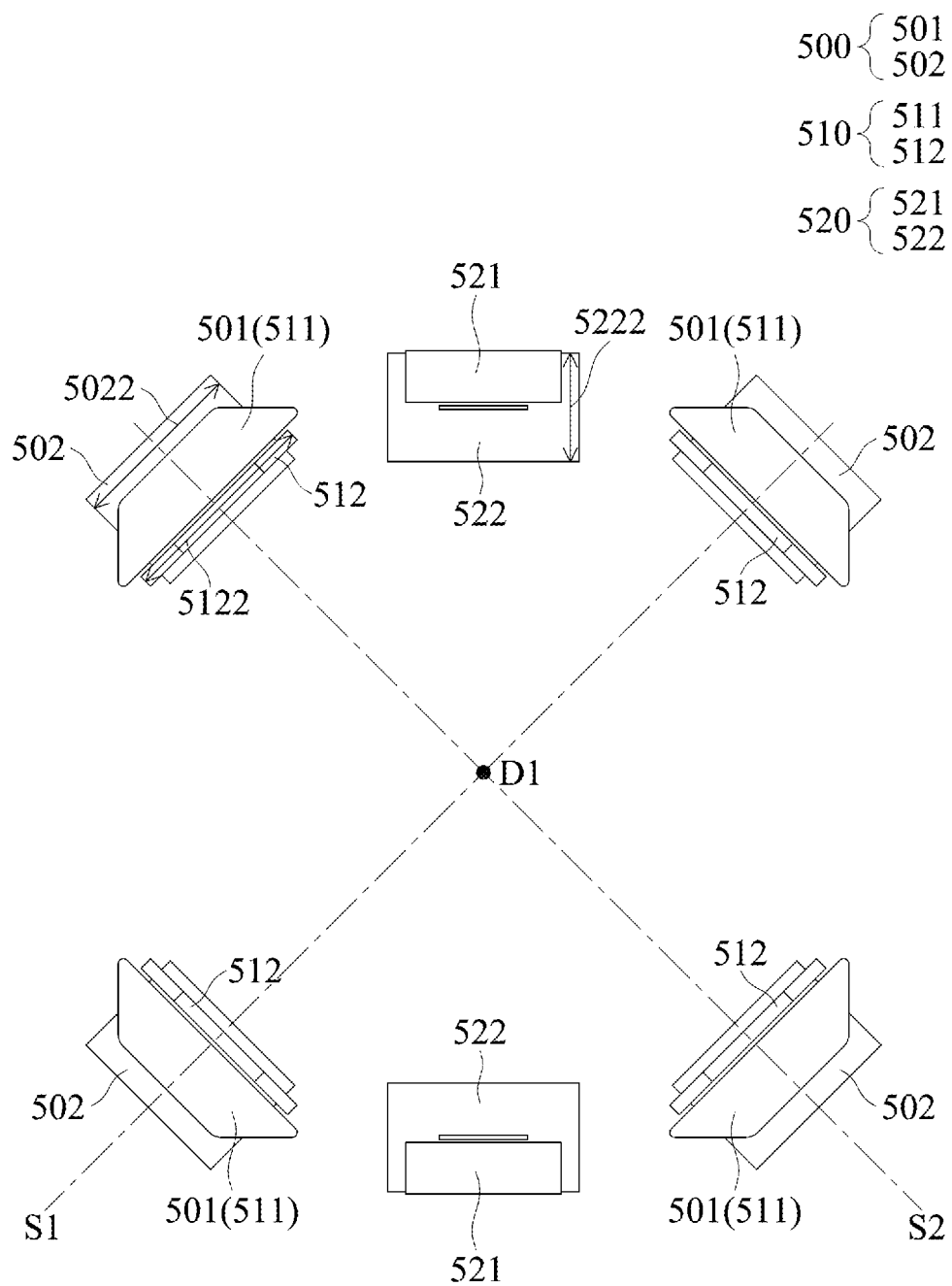
FIG. 10B shows a top view of the first driving assembly, the second driving assembly, and the third driving assembly individually, according to certain aspects of the present disclosure.

FIG. 10A shows a perspective view of the first driving assembly 500, the second driving assembly 510, and the third driving assembly 520 individually, according to certain aspects of the present disclosure. FIG. 10B shows a top view of the first driving assembly 500, the second driving assembly 510, and the third driving assembly 520 individually, according to certain aspects of the present disclosure.

As shown in FIG. 10A, for illustration purposes, the directions of the magnetic poles the first magnetic component 501 and the second magnetic component 511 are indicated on one of the first magnetic components 501, and the direction of the magnetic poles of the third magnetic component 521 is indicated on one of the third magnetic components 521.

The first coil 502 has a first segment 5022 that is perpendicular to the arrangement direction of the magnetic poles of the first magnetic component 501. The second coil 512 has a second segment 5122 that is perpendicular to the arrangement direction of the magnetic poles of the second magnetic component 511. The third coil 522 has a third segment 5222 that is perpendicular to the arrangement direction of the magnetic poles of the third magnetic component 521.

As shown in FIG. 10A, the extending direction of the first segment 5022 is parallel to the extending direction of the second segment 5122. The extending direction of the third segment 5222 is not parallel to the extending direction of the first segment 5022. The extending direction of the third segment 5222 is not perpendicular to the extending direction of the first segment 5022.

The extending direction of the third segment 5222 is not parallel to the second axis D2 when viewed along the main axis D1. The extending direction of the third segment 5222 is perpendicular to the second axis D2 when viewed along the main axis D1. The arrangement direction of the magnetic poles of the third magnetic component 521 is parallel to the second axis D2 when viewed along the main axis D1.

The first segment 5022 and the first magnetic component 501 are configured to generate a first driving force. The second segment 5122 and the second magnetic component 511 are configured to generate a second driving force. The third segment 5222 and the third magnetic component 521 are configured to generate a third driving force.

The first driving force may drive the first holder 210 (FIG. 1) to move in the first dimension relative to the frame 120 (FIG. 1). The second driving force may drive the second holder 310 (FIG. 1) to move in the second dimension relative to the frame 120 (FIG. 1). The third driving force may drive the first holder 210 (FIG. 1) to move in a third dimension relative to the frame 120 (FIG. 1).

In detail, as shown in FIG. 10B, the first axis S1 located on the plane formed by the second axis D2 and the third axis D3. Both the included angle between the first axis S1 and the second axis D2 and the included angle between the first axis S1 and the third axis D3 are 45 degrees. An axis S2 is located on the plane formed by the second axis D2 and the third axis D3, and the axis S2 is perpendicular to the first axis S1.

The first dimension is movement in the plane formed by the first axis S1 and the second axis D2 (which is also the plane formed by the second axis D2 and the third axis D3). More specifically, the first dimension is movement with the first axis S1 or the axis S2 as the moving direction. The second dimension is movement along the second optical axis O2 (FIG. 1). The third dimension is the rotation around a rotational axis, and the rotational axis is parallel to the first optical axis O1 (FIG. 1).

Figure 11A:
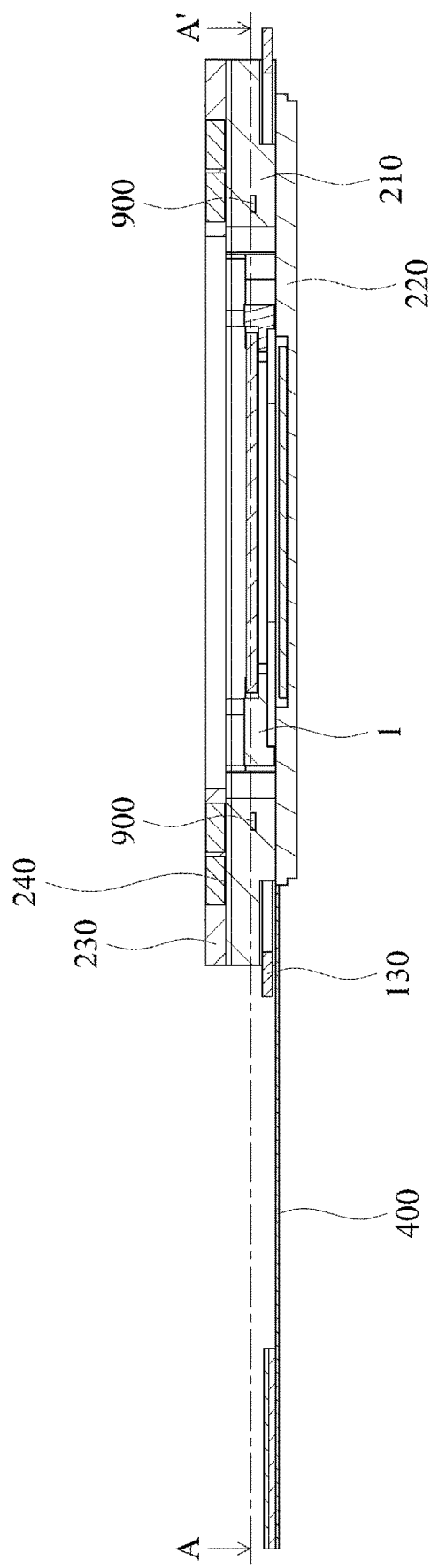
FIG. 11A is a cross-sectional view of the first holder, the first optical component, the first circuit assembly, the third circuit assembly, the fourth circuit assembly, the base, the connecting portion, and the magnetically permeable component, according to certain aspects of the present disclosure.

FIG. 11A is a cross-sectional view of the first optical component 1, the base 130, the first holder 210, the first circuit assembly 220, the third circuit assembly 230, the fourth circuit assembly 240, the connecting portion 400, and the magnetically permeable component 900. From FIG. 11A, a section of the magnetically permeable component 900 embedded in the first holder 210 can be seen.

Figure 11B:
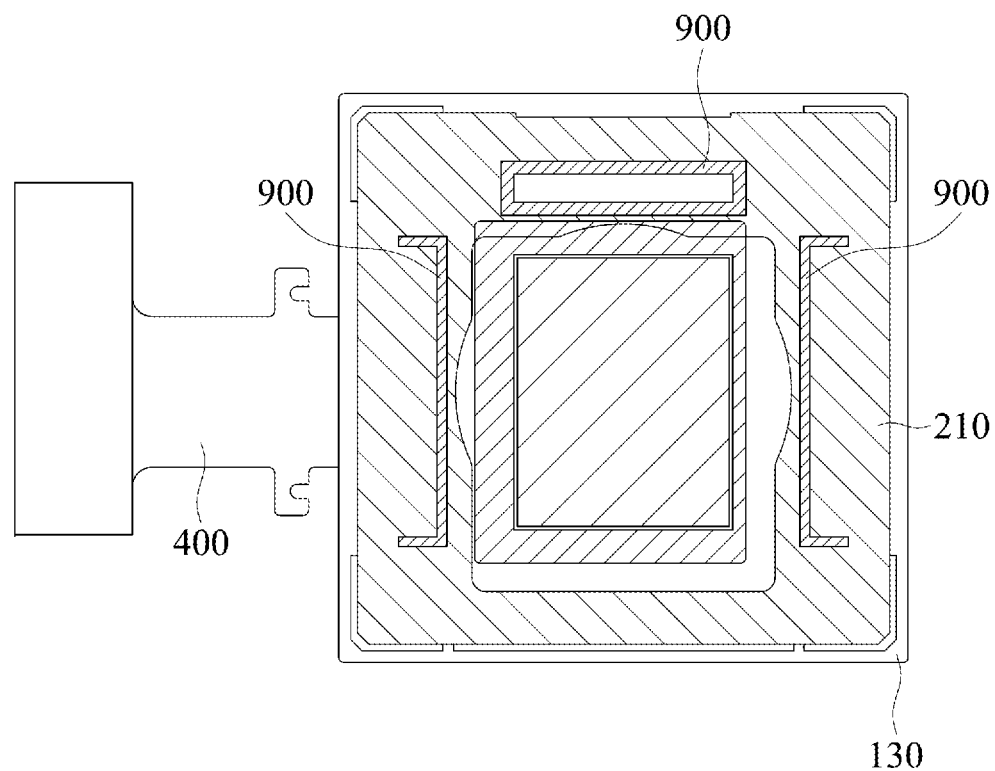
FIG. 11B is a cross-sectional view taken along the dashed line A to A' in FIG. 11A, according to certain aspects of the present disclosure.
Figure 11C:
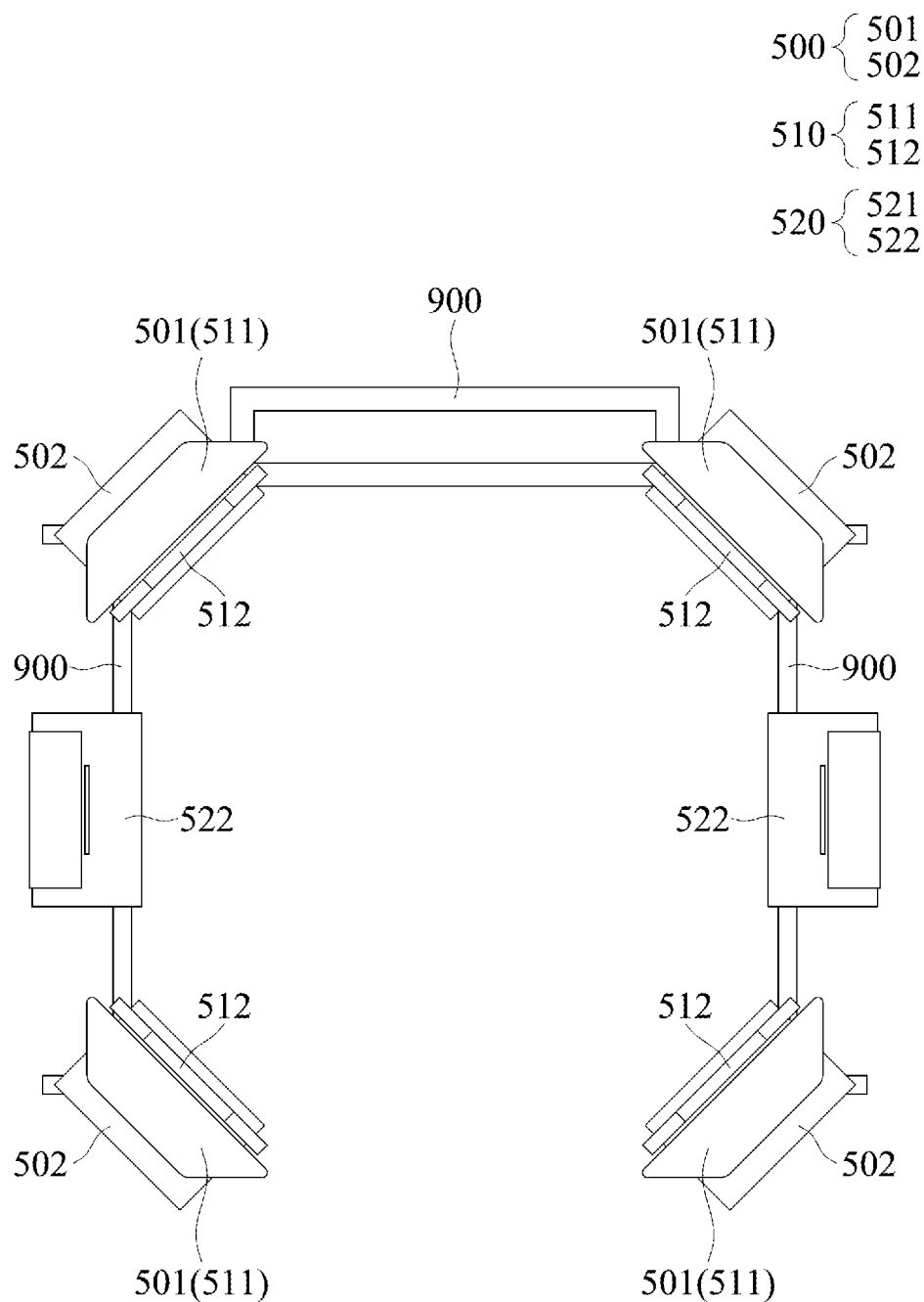
FIG. 11C shows a top view of the first driving assembly, the second driving assembly, and the third driving assembly individually, according to certain aspects of the present disclosure.

FIG. 11B is a cross-sectional view taken along the dashed line A to A' in FIG. 11A, according to certain aspects of the present disclosure. From FIG. 11B, three magnetically permeable components 900 embedded in the first holder 210 and not exposed on the first holder 210 can be seen. FIG. 11C shows a top view of the first driving assembly 500, the second driving assembly 510, the third driving assembly 520, and the magnetically permeable component 900 individually.

Referring to FIGS. 11A to 11C together, the magnetically permeable components 900 is made of a metal material. The magnetically permeable components 900 correspond to the first magnetic components 501. When viewed along the main axis D1, there are two magnetically permeable components 900 located adjacent to the first sides 121 of the frame 120 (FIG. 4C), and another magnetically permeable component 900 is located adjacent to the second side 142 of the frame 120.

The magnetically permeable component 900 at least partially overlaps the first driving assembly 500 when viewed along the main axis D1. The magnetically permeable component 900 at least partially overlaps the second driving assembly 510 when viewed along the main axis D1. The magnetically permeable component 900 at least partially overlaps the third driving assembly 520 when viewed along the main axis D1.

Figure 12:
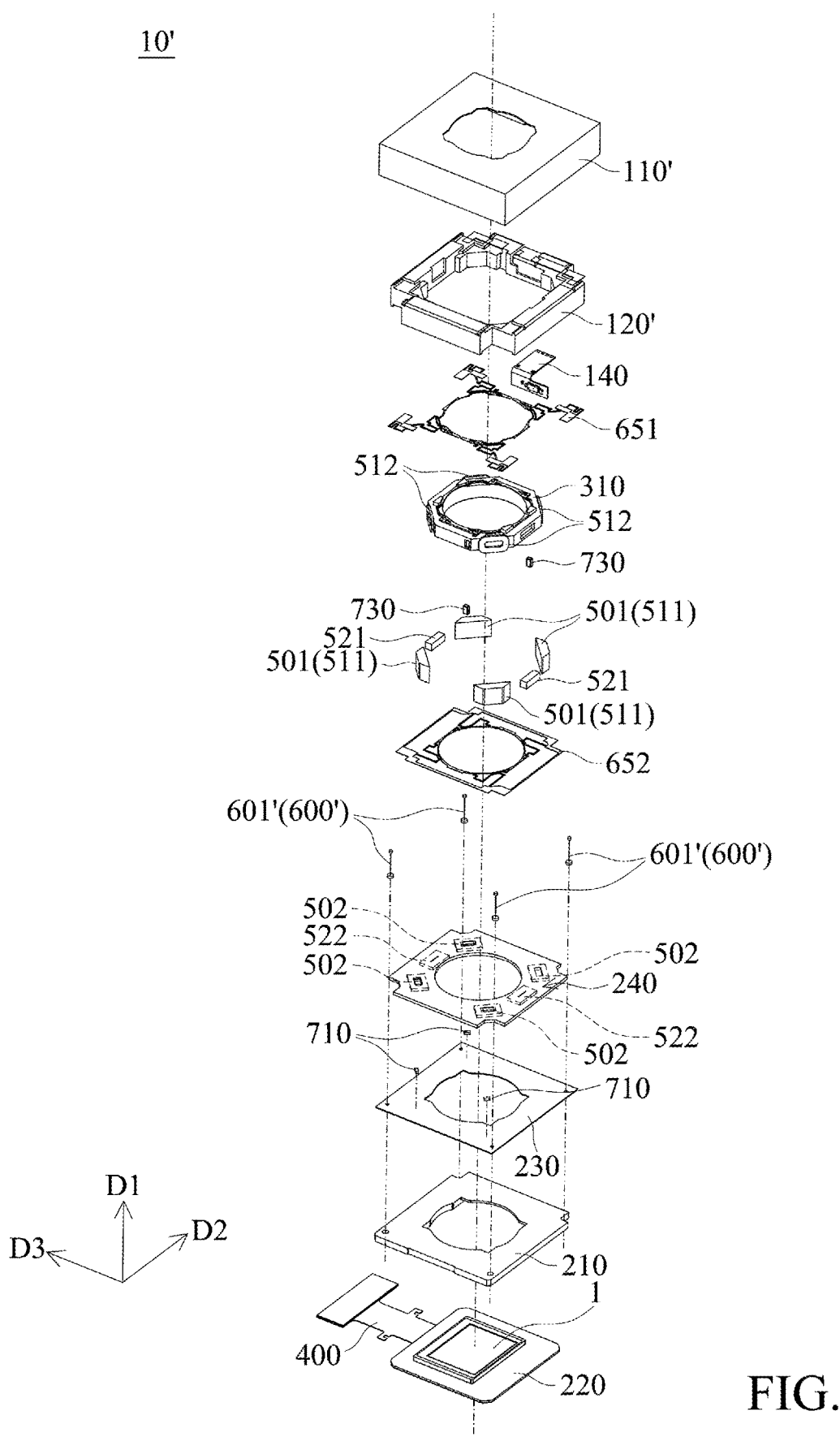
FIG. 12 is an exploded view of an optical component driving mechanism according to another embodiment of the present disclosure.

FIG. 12 is an exploded view of an optical component driving mechanism 10' according to another embodiment of the present disclosure. The difference between the optical component driving mechanism 10' shown in FIG. 12 and the optical component driving mechanism 10 shown in FIG. 1 is the housing 110', the frame 120', the base, and the first support assembly 600'.

In the embodiment shown in FIG. 12, the appearance of the housing 110' and the frame 120' of the optical component driving mechanism 10' is different from that of the housing 110 and the frame 120 of the optical component driving mechanism 10. However, the housing 110' and the frame 120' have a similar arrangement relationship with the housing 110 and the frame 120. Furthermore, the optical component driving mechanism 10' has no base.

In addition, in the embodiment shown in FIG. 1, the support components 601 are balls. In the embodiment shown in FIG. 12, the support components 601' are suspension wires. The first holder 210 is movable relative to the frame 120' via the support components 601'.

Figure 13A:
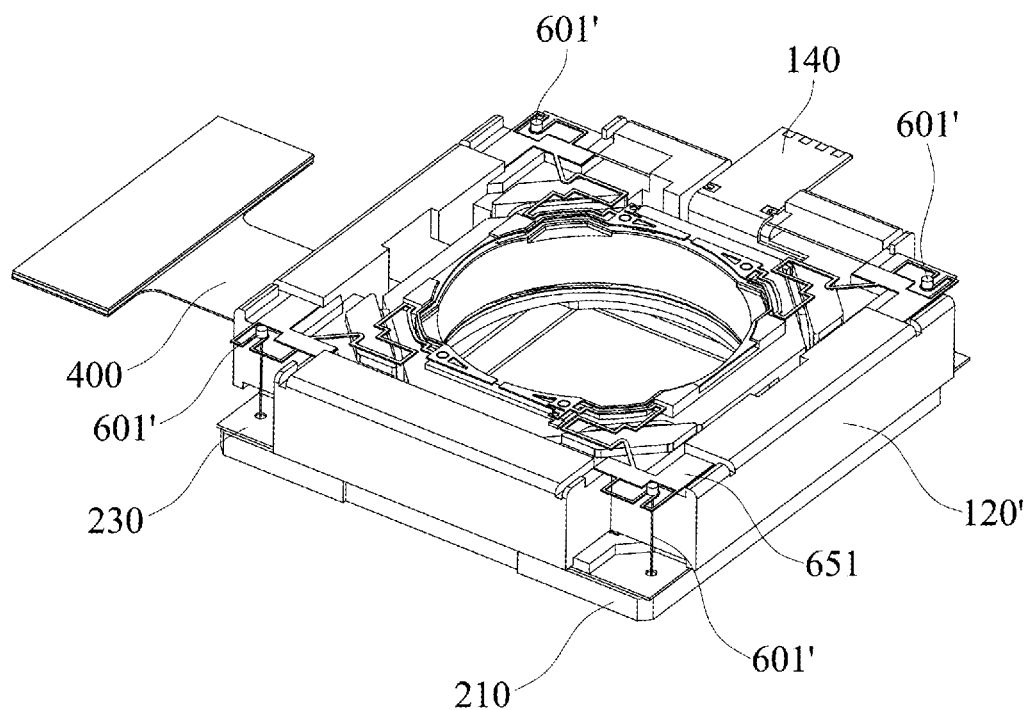
FIG. 13A shows a perspective view of the optical component driving mechanism of FIG. 12, according to certain aspects of the present disclosure, but for illustration purposes, the housing is not shown.
Figure 13A:
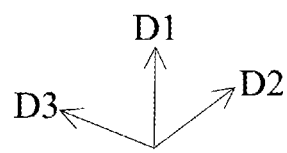
Figure 13B:
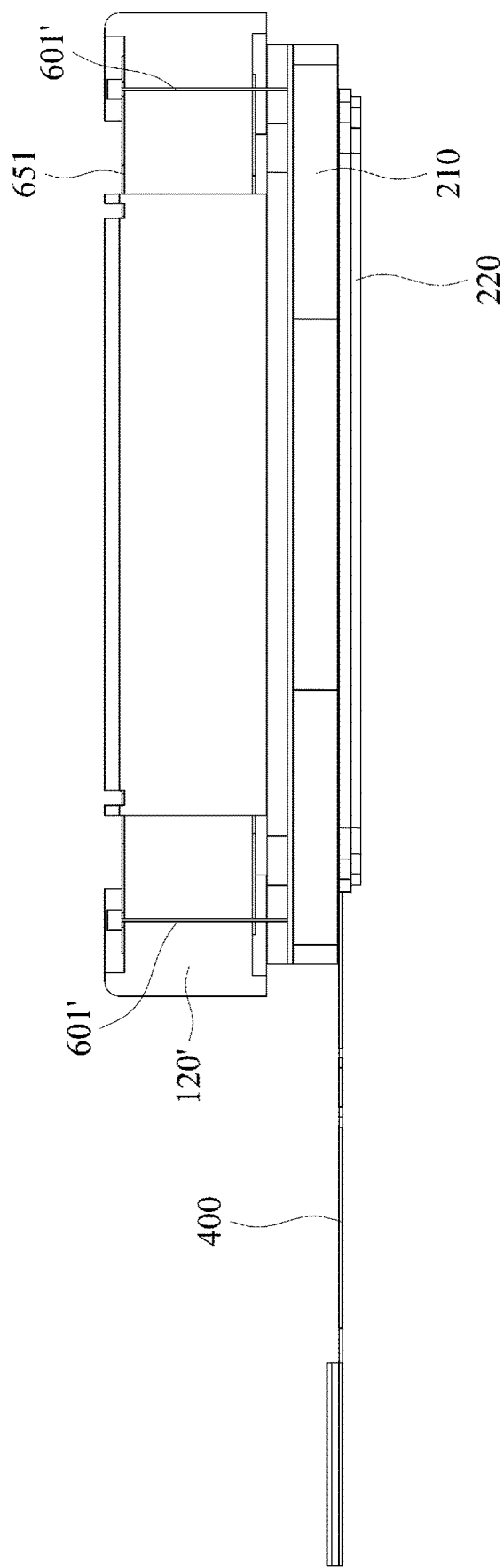
FIG. 13B shows a perspective view of the optical component driving mechanism of FIG. 12, according to certain aspects of the present disclosure, but for illustration purposes, the housing is not shown.

FIG. 13A shows a perspective view of the optical component driving mechanism 10' of FIG. 12, but the housing 110' is not shown for illustration purposes. FIG. 13B shows a perspective view of the optical component driving mechanism 10' of FIG. 12, but the housing 110' is not shown for illustration purposes.

As shown in FIGS. 13A to 13B, two ends of the support component 601' are connected to the first elastic member 651 and the first holder 210, respectively. The support component 601' may support the first holder 210 to move relative to the frame 120'.

In summary, the present invention provides an optical component driving mechanism for driving the first optical component and the second optical component, thereby achieving functions such as optical focusing or optical shake compensation. The first optical component is driven by the first driving assembly to move in a plane perpendicular to the first optical axis. The second optical component is driven by the second driving assembly to move along the second optical axis. The first optical component is driven by the third driving assembly to rotate around the first optical axis. The combination of the three driving mechanisms enables the optical component driving mechanism to have better optical focusing and optical compensation capabilities, which greatly improving the performance of electronic devices.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
   a first holder connecting a first optical component having a first optical axis;
   a frame comprising a first accommodating space for accommodating the first holder, wherein the first holder is movable relative to the frame;
   a first driving assembly configured to drive the first holder to move relative to the frame;
   a first circuit assembly electrically connected to the first driving assembly, wherein the first circuit assembly is electrically connected to the first optical component, the first optical component and the first circuit assembly at least partially overlap when viewed along the first optical axis, and the first circuit assembly is fixedly connected to the first holder; and
   a base fixedly connected to the frame, wherein the base is adjacent to the first accommodating space, the base has a metal material;
   wherein the base further comprises a stopper portion for limiting the range of motion of the first holder, the stopper portion has a metal material, the stopper portion is located between the first holder and the first circuit assembly when viewed along a first axis perpendicular to the first optical axis;
   wherein the stopper portion, the first holder, and the first circuit assembly at least partially overlap when viewed along the first optical axis.

2. The optical component driving mechanism as claimed in claim 1, wherein the first holder has a first opening, the first opening corresponds to the first optical component, and the first optical component is configured to receive an electromagnetic wave and output a signal.

3. The optical component driving mechanism as claimed in claim 1, wherein the base further comprises a second opening corresponding to the first optical component.

4. The optical component driving mechanism as claimed in claim 1, wherein the first holder has an avoidance portion, the avoidance portion corresponds to the stopper portion, the avoidance portion has a groove structure, and the first holder has a non-metallic material.

5. The optical component driving mechanism as claimed in claim 1, wherein the frame further comprises:
   a second accommodating space for accommodating a second optical component;
   an inner wall having an inner surface; and
   a frame protrusion protruding from the inner wall;
   wherein the extending direction of the frame protrusion is not parallel to the first optical axis of the first optical component, the frame protrusion is adjacent to the second accommodating space, and the frame protrusion has a first frame surface facing the first accommodating space, the frame protrusion overlaps the second accommodating space when viewed along the first axis, the first accommodating space is connected to the second accommodating space, and a main axis passes through the first accommodating space and the second accommodating space.

6. The optical component driving mechanism as claimed in claim 5, further comprising:
   a second holder connecting the second optical component with a second optical axis, wherein the second holder is movable relative to the frame and the first holder;
   a second driving assembly configured to drive the second holder to move relative to the frame in a second dimension; and
   a third driving assembly configured to drive the first holder to move relative to the frame in a third dimension.

7. The optical component driving mechanism as claimed in claim 6, wherein the first driving assembly is configured to drive the first holder to move relative to the frame in a first dimension, and the first dimension is different from the second dimension, the second dimension is different from the third dimension, and the first dimension is different from the third dimension.

8. The optical component driving mechanism as claimed in claim 7, wherein the first dimension is movement in the plane formed by the first axis and a second axis, and the second dimension is movement along the second optical axis, the third dimension is rotation with a rotation axis as the axle center, and the rotation axis is parallel to the first optical axis.

9. The optical component driving mechanism as claimed in claim 6, wherein the first driving assembly comprises:
   a first magnetic component; and
   a first coil, corresponding to the first magnetic component, wherein the first coil comprises a first segment, and the first segment and the first magnetic component are configured to generate a first driving force;
   wherein the second driving assembly comprises:
   a second magnetic component; and
   a second coil, corresponding to the second magnetic component, wherein the second coil comprises a second segment, and the second segment and the second magnetic component are configured to generate a second driving force;
   wherein the third driving assembly comprises:
   a third magnetic component; and
   a third coil, corresponding to the third magnetic component, wherein the third coil comprises a third segment, and the third segment and the third magnetic component are configured to generate a third driving force;
   wherein the arrangement direction of the magnetic poles of the first magnetic component is perpendicular to the first segment, the arrangement direction of the magnetic poles of the second magnetic component is perpendicular to the second segment, and the arrangement direction of the magnetic poles of the third magnetic component is perpendicular to the third segment.

10. The optical component driving mechanism as claimed in claim 9, wherein a first side of the frame having a polygonal structure extends along the second axis when viewed along the main axis, the third magnetic component is located at the first side, the extending direction of the third segment is perpendicular to the second axis when viewed along the main axis, the arrangement direction of the magnetic poles of the third magnetic component is parallel to the second axis when viewed along the main axis, the extension direction of the first segment is parallel to the extension direction of the second segment, the extension direction of the third segment is not parallel with and not perpendicular to the extension direction of the first segment, and the frame protrusion of the frame is configured to position the first magnetic component and the second magnetic component, wherein the first magnetic component and the second magnetic component have an integrated structure.

11. The optical component driving mechanism as claimed in claim 10, further comprising:
   a first support assembly comprising a support component, wherein the first holder is movable relative to the frame via the first support assembly, the support component is located at a corner of the frame when viewed along the main axis, and the first magnetic component is located at the corner when viewed along the main axis; and
   a second support assembly comprising a first elastic component and a second elastic component, wherein the second holder is movable relative to the frame via the second support assembly, the first support assembly partially overlaps the second support assembly when viewed along the first optical axis, the second holder is movably connected to the frame via the first elastic component and the second elastic component, the first elastic component is located in a third accommodating space of the frame, the frame protrusion has a second frame surface facing the third accommodating space, the first frame surface and the second frame surface face in opposite directions, the third accommodating space is connected to the second accommodating space, the main axis passes through the third accommodating space, and the first frame surface partially overlaps the second frame surface when viewed along the main axis.

12. The optical component driving mechanism as claimed in claim 11, further comprising a magnetically permeable component corresponding to the first magnetic component, wherein the magnetically permeable component is located on the first side when viewed along the main axis, the magnetically permeable component at least partially overlaps the first driving assembly when viewed along the main axis, the magnetically permeable component at least partially overlaps the second driving assembly when viewed along the main axis, the magnetically permeable component at least partially overlaps the third driving assembly when viewed along the main axis, the corner is adjacent to the first side when viewed along the main axis, the magnetically permeable component has a metal material, the magnetically permeable component is at least partially embedded in the first holder and is at least partially not exposed on the first holder.

13. The optical component driving mechanism as claimed in claim 11, further comprising a housing fixedly connected to the frame, wherein the housing is adjacent to the third accommodating space, the housing has a plate-like structure, the first elastic component and the second elastic component both have a plate-like structure, the first elastic component and the support component partially overlap when viewed along the main axis, the second elastic component and the support component do not overlap when viewed along the main axis.

14. The optical component driving mechanism as claimed in claim 11, further comprising:
   a first sensing component for sensing the movement of the first holder; and
   a second sensing component for sensing the movement of the second holder;
   wherein when viewed in any direction perpendicular to the main axis, neither the first sensing component nor the second sensing component overlaps.

15. The optical component driving mechanism as claimed in claim 14, further comprising a second circuit assembly and a strengthening assembly, wherein the second circuit assembly is electrically connected to the second driving assembly and the second sensing component, the second circuit assembly comprises a first portion and a second portion, the first portion and the second portion both have a plate-like structure, the first portion and the second portion are not parallel to each other, the second sensing component is disposed on the first portion, the second driving assembly is electrically connected to the second circuit assembly via the strengthening assembly, the second driving assembly is electrically connected to the second circuit assembly via the second support assembly, and the strengthening assembly is fixedly connected to the frame, wherein the strengthening assembly has a metal material, and the frame has a non-metallic material.

16. The optical component driving mechanism as claimed in claim 15, further comprising a third circuit assembly and a fourth circuit assembly, wherein the first coil and the third coil are each embedded in the third circuit assembly, the third circuit assembly is electrically connected to the first circuit assembly via the fourth circuit assembly, the third circuit assembly and the fourth circuit assembly both have a plate-like structure, the fourth circuit assembly is electrically connected to the first sensing component, the first sensing component is disposed on the fourth circuit assembly, the third circuit assembly is disposed on the fourth circuit assembly, and the first portion is not parallel to the fourth circuit assembly.

17. The optical component driving mechanism as claimed in claim 16, wherein the first holder, the first circuit assembly, the third circuit assembly, and the fourth circuit assembly serve as a first movable portion, the first driving assembly is configured to drive the first movable portion to move relative to the frame, the second holder serves as a second movable portion, and the second driving assembly is configured to drive the second movable portion to move relative to the frame.

18. The optical component driving mechanism as claimed in claim 17, further comprising:
   a first shock absorbing component restraining the abnormal movement of the first movable portion, wherein the first shock absorbing component has flexibility, the first shock absorbing component has a non-metallic material, the first shock absorbing component is in direct contact with the first movable portion, the frame, and the third circuit assembly, and the first shock absorbing component is located in the first accommodating space;
   a second shock absorbing component restraining the abnormal movement of the first movable portion, wherein the second shock absorbing component is in direct contact with the first movable portion, and the second shock absorbing component is in direct contact with the frame, the base, and the first holder;
   a third shock absorbing component restraining the abnormal movement of the first movable portion, wherein the third shock absorbing component is in direct contact with the first movable portion, and the third shock absorbing component is in direct contact with an avoidance portion of the base, the first holder, and the first circuit assembly; and
   a fourth shock absorbing component restraining the abnormal movement of the first movable portion and the second movable portion, wherein the fourth shock absorbing component is in direct contact with the first movable portion, the fourth shock absorbing component is in direct contact with the second movable portion, and the fourth shock absorbing component is in direct contact with the third circuit assembly and the second holder.

* * * * *